US012641652B2

(12) United States Patent
Xu et al.

(10) Patent No.: US 12,641,652 B2
(45) Date of Patent: May 26, 2026

(54) COMMUNICATION METHOD AND APPARATUS

(71) Applicant: HUAWEI TECHNOLOGIES CO., LTD., Shenzhen (CN)

(72) Inventors: Xiuqiang Xu, Shanghai (CN); Yunhao Zhang, Shanghai (CN); Lei Wang, Shanghai (CN); Fan Wei, Shenzhen (CN); Yan Chen, Ottowa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 417 days.

(21) Appl. No.: 18/505,239

(22) Filed: Nov. 9, 2023

(65) Prior Publication Data

US 2024/0080907 A1 Mar. 7, 2024

Related U.S. Application Data

(63) Continuation of application No. PCT/CN2022/086555, filed on Apr. 13, 2022.

(30) Foreign Application Priority Data

May 10, 2021 (CN) .......................... 202110507930.6

(51) Int. Cl.
H04W 74/0833 (2024.01)
H04B 7/06 (2006.01)
(Continued)

(52) U.S. Cl.
CPC .... H04W 74/0833 (2013.01); H04B 7/06968 (2023.05); H04B 17/328 (2023.05); H04L 5/0051 (2013.01)

(58) Field of Classification Search
CPC ............. H04W 72/23; H04W 72/0446; H04W 74/0833; H04W 72/21; H04W 72/0453;
(Continued)

(56) References Cited

U.S. PATENT DOCUMENTS 11,432,338 B2 * 8/2022 Hakola ............. H04W 74/0833
2021/0051707 A1 * 2/2021 Rastegardoost .... H04W 74/006
(Continued)

FOREIGN PATENT DOCUMENTS

CN 111277382 A * 6/2020 ........ H04W 74/0833
EP 4013177 A1 6/2022

OTHER PUBLICATIONS

Extended European Search Report issued in EP22806409.3, dated Jan. 3, 2025, 13 pages.

*Primary Examiner* — Khalid W Shaheed

(57) ABSTRACT

The present disclosure relates to the field of wireless communication technologies. A terminal device receives configuration information, which indicates that one first combination is mapped to a plurality of downlink reference signals, and one first combination is mapped to a plurality of second combinations. The terminal device then determines a mapping relationship between a first combination and downlink reference signals, a mapping relationship between a first combination and second combinations, and a mapping relationship between second combinations and downlink reference signals based on the configuration information. Next, a first preamble is sent on a first random access channel (RO) included in a selected first combination, and a first uplink reference signal is sent on a first physical uplink shared channel occasion (PO) included in a selected second combination. The selected first combination has a mapping relationship with the selected second combination. A selected downlink reference signal group is indicated by the selected first combination.

19 Claims, 5 Drawing Sheets

Terminal device

Network device

Step 501: Configuration information

Step 502: Determine a mapping relationship between PREs and SSBs, a mapping relationship between PREs and PRUs, and a mapping relationship between SSBs and PRUs Step 503: Select a PRE and a PRU Step 504: Send a message A based on the selected PRE and the selected PRU Step 505: Message B

(51) Int. Cl.
    *H04B 17/318*     (2015.01)
    *H04L 5/00*     (2006.01)

(58) Field of Classification Search
    CPC ........... H04W 74/006; H04W 72/1273; H04W
                48/12; H04W 74/004; H04W 52/146;
                           H04W 56/0005
    See application file for complete search history.

(56)              References Cited

U.S. PATENT DOCUMENTS

| | | | |
|---|---|---|---|
| 2021/0345422 A1 | 11/2021 | Chen | |
| 2022/0159634 A1* | 5/2022 | Rastegardoost | ...... H04W 72/23 |
| 2022/0256612 A1* | 8/2022 | MolavianJazi | ..... H04W 56/001 |

* cited by examiner

Communication system 100

Network device
102

Terminal
device 101

Terminal
device

Network
device

Message 1: PRACH, preamble preamble

Message 2: Downlink control information DCI
and random access response RAR

Message 3: PUSCH, random access data

Message 4: Contention resolution

Communication apparatus 900

Communication apparatus
1000

COMMUNICATION METHOD AND APPARATUS

CROSS-REFERENCE TO RELATED APPLICATIONS

This application is a continuation of International Application No. PCT/CN2022/086555 filed on Apr. 13, 2022, which claims priority to Chinese Patent Application No. 202110507930.6, filed on May 10, 2021. The disclosures of the aforementioned applications are hereby incorporated by reference in their entireties.

TECHNICAL FIELD

Embodiments of the present disclosure relate to fields such as wireless communication, and in particular, to a communication method and apparatus.

BACKGROUND

In a wireless communication system, a terminal device accesses a network device through a random access (RA) process.

A synchronization signal/physical broadcast channel block (SS/PBCH block) is introduced into a 5th generation (5G) system or new radio (NR), and the SS/PBCH block may be referred to as a synchronization signal block (SSB) for short. The network device sends a plurality of SSBs in one period in a scanning manner, and different SSBs correspond to different spatial directions (for example, correspond to different beams). Generally, a higher frequency indicates a larger quantity of SSBs and narrower beams for sending the SSBs.

The terminal device performs reference signal received power (RSRP) measurement on the SSBs sent by the network device. When an RSRP measurement result of an SSB is greater than or equal to a preset threshold, the terminal device may select a time-frequency resource to which the SSB is mapped, to perform an access process or a data transmission process.

In the access process or the data transmission process, how to reduce a delay and/or improve reliability is a technical problem that needs to be resolved.

SUMMARY

Embodiments of the present disclosure provide a communication method and apparatus, to reduce a delay and/or improve reliability.

According to a first aspect, a communication method is provided: A terminal device receives configuration information from a network device, where the configuration information indicates a quantity mapping relationship between a first combination and downlink reference signals and a quantity mapping relationship between a first combination and second combinations. The first combination includes a random access channel occasion (RO) and a preamble, the second combination includes a physical uplink shared channel occasion (PO) and an uplink reference signal, one first combination is mapped to a plurality of downlink reference signals, and one first combination is mapped to a plurality of second combinations. The terminal device then determines a mapping relationship between a first combination and downlink reference signals, a mapping relationship between a first combination and second combinations, and a mapping relationship between second combinations and downlink reference signals based on the configuration information. The terminal device then sends a message A to the network device, where the message A includes a first preamble and a first uplink reference signal, the first preamble is sent on a first RO, and the first uplink reference signal is sent on a first PO. The first preamble and the first RO are included in a first combination selected by the terminal device; the first uplink reference signal and the first PO are included in a second combination selected by the terminal device; the selected first combination has a mapping relationship with the selected second combination; and the selected first combination is selected based on downlink reference signals.

In the first aspect, in one aspect, one first combination (for example, an RO in the first combination) is mapped to a plurality of downlink reference signals, so that a scanning period of the downlink reference signals is shortened, and the terminal device can find a downlink reference signal with an optimal RSRP as soon as possible, thereby reducing a random access delay. In another aspect, the terminal device may select one first combination from a plurality of first combinations, and implicitly indicate, by using the selected first combination (for example, an RO in the first combination), a downlink reference signal group selected by the terminal device. The terminal device then selects a second combination from a plurality of second combinations to which the selected first combination is mapped, and implicitly indicates, by using the selected second combination (which, for example, may be a PO in the second combination), a less part of downlink reference signals in the downlink reference signal group. When the network device detects a PUSCH, even if the network device cannot correctly decode the PUSCH, the network device may learn of better downlink reference signals than the downlink reference signals indicated by the first combination. In this way, a beam used during subsequent communication between the network device and the terminal is more accurate, and communication reliability is improved.

In a possible implementation, the configuration information further indicates the mapping relationship between the first combination and the downlink reference signals, the mapping relationship between the first combination and the second combinations, and the mapping relationship between the second combinations and the downlink reference signals.

In a possible implementation, in a plurality of downlink reference signals to which the selected first combination is mapped, an RSRP of at least one downlink reference signal is greater than or equal to a preset threshold; or in a plurality of downlink reference signals to which the selected first combination is mapped, an RSRP of a default downlink reference signal is greater than or equal to a preset threshold.

In a possible implementation, the selected second combination is: a second combination to which a downlink reference signal with a largest RSRP is mapped in the plurality of downlink reference signals to which the selected first combination is mapped; or a second combination to which the default downlink reference signal is mapped in the plurality of downlink reference signals to which the selected first combination is mapped; or a second combination to which any downlink reference signal whose RSRP is greater than that of the default downlink reference signal is mapped in the plurality of downlink reference signals to which the selected first combination is mapped.

In a possible implementation, the terminal device uses, as the selected second combination, a second combination to which a candidate downlink reference signal is mapped, where the candidate downlink reference signal may be understood as a downlink reference signal used to select the first combination. Alternatively, the terminal device uses, as the selected second combination, a second combination to which a downlink reference signal with a largest RSRP is mapped in M downlink reference signals to which the selected first combination is mapped. Alternatively, the terminal device uses, as the selected second combination, a second combination to which a default downlink reference signal is mapped in M downlink reference signals to which the selected first combination is mapped. Alternatively, the terminal device uses, as the selected second combination, a second combination to which any downlink reference signal whose RSRP is greater than that of the default downlink reference signal is mapped in M downlink reference signals to which the selected first combination is mapped.

In a possible implementation, the terminal device may further determine the default downlink reference signal in the plurality of downlink reference signals to which the first combination is mapped.

In a possible implementation, the default downlink reference signal is specified in a protocol or configured by the network device.

In a possible implementation, the terminal device receives a message B from the network device by using a quasi co-location (QCL) feature the same as that of a downlink reference signal to which the selected second combination is mapped.

According to a second aspect, a communication method is provided. First, a terminal device receives first configuration information from a network device, where the first configuration information indicates a quantity mapping relationship between a first combination and downlink reference signals. The first combination includes a random access channel occasion (RO) and a preamble, and one first combination is mapped to a plurality of downlink reference signals. The terminal device then determines a mapping relationship between a first combination and downlink reference signals based on the first configuration information. Next, the terminal device sends a message 1 to the network device, where the message 1 includes a first preamble, the message 1 is sent on a first RO, the first preamble and the first RO are included in a first combination selected by the terminal device, and the selected first combination is selected based on downlink reference signals. The terminal device then receives a message 2 from the network device, where the message 2 includes second configuration information, the second configuration information indicates a quantity of second combinations, and the second combination includes a physical uplink shared channel occasion (PO) and an uplink reference signal. Further, the terminal device determines, based on the second configuration information, a mapping relationship between the second combinations and downlink reference signals to which the selected first combination is mapped. Still further, the terminal device sends a message 3 to the network device, where the message 3 includes a first uplink reference signal, the message 3 is sent on a first PO, and the first uplink reference signal and the first PO are included in a second combination selected by the terminal device.

Beneficial effects of the second aspect are the same as those of the first aspect.

In a possible implementation, the first configuration information further indicates the mapping relationship between the first combination and the downlink reference signals; and/or the second configuration information further indicates a mapping relationship between second combinations and downlink reference signals.

In a possible implementation, in a plurality of downlink reference signals to which the selected first combination is mapped, an RSRP of at least one downlink reference signal is greater than or equal to a preset threshold; or in a plurality of downlink reference signals to which the selected first combination is mapped, an RSRP of a default downlink reference signal is greater than or equal to a preset threshold.

In a possible implementation, the selected second combination is: a second combination to which a downlink reference signal with a largest RSRP is mapped in the plurality of downlink reference signals to which the selected first combination is mapped; or a second combination to which the default downlink reference signal is mapped in the plurality of downlink reference signals to which the selected first combination is mapped; or a second combination to which any downlink reference signal whose RSRP is greater than that of the default downlink reference signal is mapped in the plurality of downlink reference signals to which the selected first combination is mapped.

In a possible implementation, the terminal device further determines the default downlink reference signal in the plurality of downlink reference signals to which the first combination is mapped.

In a possible implementation, the default downlink reference signal is specified in a protocol or configured by the network device.

In a possible implementation, the terminal device may further receive a message 2 from the network device by using a quasi co-location (QCL) feature the same as that of a downlink reference signal to which the selected second combination is mapped.

According to a third aspect, a communication method is provided. First, a terminal device receives first configuration information from a network device, where the first configuration information indicates a quantity mapping relationship between a first combination and downlink reference signals. The first combination includes a random access channel occasion (RO) and a preamble, and one first combination is mapped to a plurality of downlink reference signals. The terminal device then determines a mapping relationship between a first combination and downlink reference signals based on the first configuration information. The terminal device then sends a message 1 to the network device, where the message 1 includes a first preamble, the message 1 is sent on a first RO, the first preamble and the first RO are included in a first combination selected by the terminal device, and the selected first combination is selected based on downlink reference signals. Next, the terminal device receives a message 2 from the network device by using a quasi co-location (QCL) feature the same as that of a default downlink reference signal, where the default downlink reference signal is a default downlink reference signal in a plurality of downlink reference signals to which the selected first combination is mapped.

In the third aspect, a default SSB is set, so that it can be ensured that a QCL feature used by UE to receive a response message is consistent with a QCL feature used by the network device to send a response message. This can improve response message receiving performance.

According to a fourth aspect, a communication method is provided. First, a terminal device receives first configuration information from a network device, where the first configuration information indicates a quantity mapping relationship between a first combination and downlink reference signals. The first combination includes a random access channel occasion (RO) and a preamble, and one first combination is mapped to a plurality of downlink reference signals. A mapping relationship between a first combination and downlink reference signals is then determined based on the first configuration information. The terminal device then sends a message A to the network device, where the message A includes a first preamble, the message A is sent on a first RO, the first preamble and the first RO are included in a first combination selected by the terminal device, and the selected first combination is selected based on downlink reference signals. Next, the terminal device receives a message B from the network device by using a quasi co-location (QCL) feature the same as that of a default downlink reference signal, where the default downlink reference signal is a default downlink reference signal in a plurality of downlink reference signals to which the selected first combination is mapped.

In the fourth aspect, a default SSB is set, so that it can be ensured that a QCL feature used by UE to receive a response message is consistent with a QCL feature used by the network device to send a response message. This can improve response message receiving performance.

A plurality of possible implementations described below are applicable to the third aspect, and are also applicable to the fourth aspect.

In a possible implementation, the first configuration information further indicates the mapping relationship between the first combination and the downlink reference signals.

In a possible implementation, in a plurality of downlink reference signals to which the selected first combination is mapped, an RSRP of a default downlink reference signal is greater than or equal to a preset threshold.

In a possible implementation, the terminal device may further determine the default downlink reference signal in the plurality of downlink reference signals to which the first combination is mapped.

In a possible implementation, the default downlink reference signal is specified in a protocol or configured by the network device.

According to a fifth aspect, a communication method is provided: A terminal device receives third configuration information from a network device, where the third configuration information indicates a quantity mapping relationship between a third combination and downlink reference signals. The third combination includes a TO and an uplink reference signal, and one third combination is mapped to a plurality of downlink reference signals. The terminal device then determines a mapping relationship between a third combination and downlink reference signals based on the third configuration information. Next, the terminal device sends a first uplink reference signal to the network device, where the first uplink reference signal is sent on a first TO, the first uplink reference signal and the first TO are included in a third combination selected by the terminal device, and the selected third combination is selected based on downlink reference signals. Next, a response message from the network device is received by using a quasi co-location (QCL) feature the same as that of a default downlink reference signal, where the default downlink reference signal is a default downlink reference signal in a plurality of downlink reference signals to which the selected third combination is mapped.

In the fifth aspect, a default SSB is set, so that it can be ensured that a QCL feature used by UE to receive a response message is consistent with a QCL feature used by the network device to send a response message. This can improve response message receiving performance.

In a possible implementation, the third configuration information further indicates the mapping relationship between the third combination and the downlink reference signals.

In a possible implementation, in the plurality of downlink reference signals to which the selected third combination is mapped, an RSRP of the default downlink reference signal is greater than or equal to a preset threshold.

In a possible implementation, the terminal device determines the default downlink reference signal in the plurality of downlink reference signals to which the third combination is mapped.

In a possible implementation, the default downlink reference signal is specified in a protocol or configured by the network device.

According to a sixth aspect, a communication apparatus is provided, and the apparatus has functions of implementing the first aspect to the fifth aspect and any possible implementation of each aspect. The functions may be implemented by hardware, or may be implemented by hardware by executing corresponding software. The hardware or software includes one or more functional modules corresponding to the foregoing function.

According to a seventh aspect, a communication apparatus is provided, including a processor, and optionally, further including a memory. The processor is coupled to the memory. The memory is configured to store computer programs or instructions. The processor is configured to execute all or some of computer programs or instructions in the memory. When all or some of computer programs or instructions are executed, the processor is configured to implement functions of the terminal device in the first aspect to the fifth aspect and any possible implementation of each aspect.

In a possible implementation, the apparatus may further include a transceiver, and the transceiver is configured to transmit a signal processed by the processor, or receive a signal input into the processor. The transceiver may perform a sending action or a receiving action performed by the terminal device in the first aspect to the fifth aspect and any possible implementation of each aspect.

According to an eighth aspect, the present disclosure provides a chip system, where the chip system includes one or more processors (which may also be referred to as processing circuits). The processor is electrically coupled to a memory (which may also be referred to as a storage medium). The memory may be located in the chip system, or may not be located in the chip system. The memory is configured to store computer programs or instructions. The processor is configured to execute all or some of computer programs or instructions in the memory. When all or some of computer programs or instructions are executed, the processor is configured to implement functions of the terminal device in the first aspect to the fifth aspect and any possible implementation of each aspect.

In a possible implementation, the chip system may further include an input/output interface (which may also be referred to as a communication interface). The input/output interface is configured to output a signal processed by the processor, or receive a signal input to the processor. The input/output interface may perform a sending action or a receiving action performed by the terminal device in the first aspect to the fifth aspect and any possible implementation of each aspect. The output interface performs a transmitting action, and the input interface performs a receiving action.

In a possible implementation, the chip system may include a chip, or may include a chip and another discrete device.

According to a ninth aspect, a computer-readable storage medium is provided, configured to store a computer program, where the computer program includes instructions used to implement functions in the first aspect, the first aspect to the fifth aspect, and any possible implementation of each aspect.

Alternatively, a computer-readable storage medium is configured to store a computer program. When the computer program is executed by a computer, the computer is enabled to perform the method performed by the terminal device in the first aspect to the fifth aspect and any possible implementation of each aspect.

According to a tenth aspect, a computer program product is provided. The computer program product includes computer program code. When the computer program code runs on a computer, the computer is enabled to perform the method performed by the terminal device in the first aspect to the fifth aspect and any possible implementation of each aspect.

According to an eleventh aspect, a communication system is provided. The communication system includes a terminal device that performs the method in the first aspect to the fifth aspect and any possible implementation of each aspect, and a network device that communicates with the terminal device.

For technical effects of the sixth aspect to the eleventh aspect, refer to the descriptions of the first aspect to the fifth aspect.

DESCRIPTION OF EMBODIMENTS

To facilitate understanding of technical solutions in embodiments of the present disclosure, the following briefly describes a system architecture of a method provided in embodiments of the present disclosure. It may be understood that the system architecture described in embodiments of the present disclosure is intended to describe the technical solutions in embodiments of the present disclosure more clearly, and do not constitute any limitation on the technical solutions provided in embodiments of the present disclosure.

The technical solutions in embodiments of the present disclosure may be applied to various communication systems, for example, a wireless local area network (WLAN) communication system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5G system, an NR system, a 6th generation (6G) system, and a future communication system.

For ease of understanding embodiments of the present disclosure, the following describes an application scenario of the present disclosure. A network architecture and a service scenario described in embodiments of the present disclosure are intended to describe the technical solutions in embodiments of the present disclosure more clearly, and do not constitute any limitation on the technical solutions provided in embodiments of the present disclosure. Persons of ordinary skill in the art may know that, as a new service scenario emerges, the technical solutions provided in embodiments of the present disclosure are also applicable to a similar technical problem.

Figure 1:
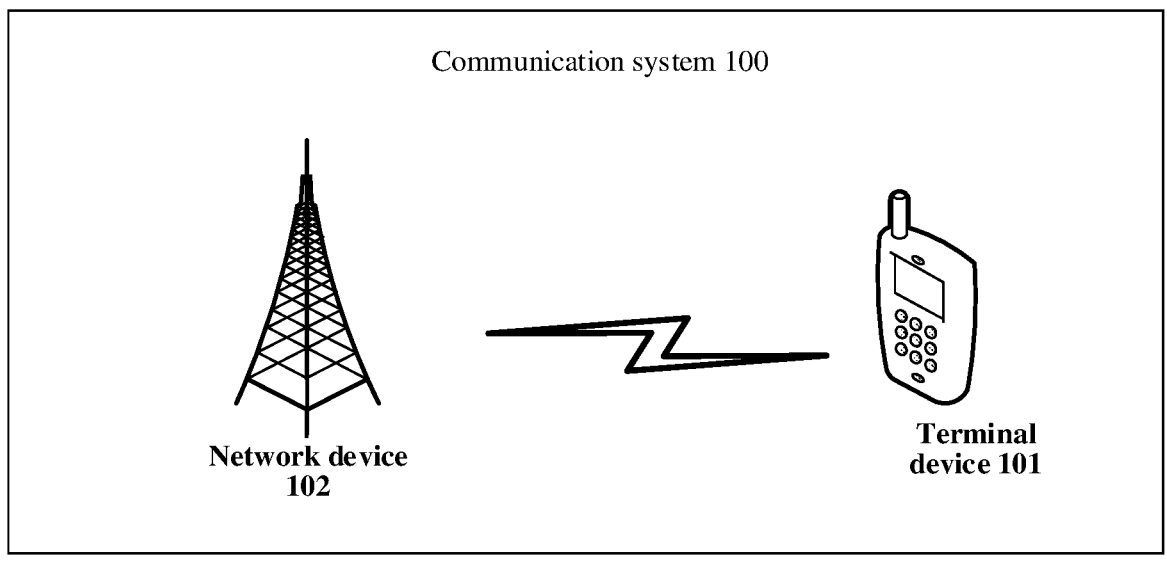
FIG. 1 is a schematic diagram of a communication system according to an embodiment of the present disclosure.

A communication system applicable to embodiments of the present disclosure is described in detail by using a communication system shown in FIG. 1 as an example. As shown in FIG. 1, a communication system 100 includes a terminal device 101 and a network device 102. In a wireless communication system, to establish a connection to the network device 102 and request the network device 102 to allocate a corresponding resource to the terminal device 101 to perform normal service transmission, the terminal device 101 generally first needs to perform random access to the network device 102. In other words, the terminal device 101 accesses the network device 102 through a random access process.

The network device has a device capable of providing a random access function for the terminal device or a chip that can be disposed in the device. The device includes but is not limited to: an evolved NodeB (eNB), a radio network controller (RNC), a NodeB (NB), a base station controller (BSC), a base transceiver station (BTS), a home base station (for example, home evolved, NodeB, or home NodeB, HNB), a baseband unit (BBU), an access point (AP) in a wireless fidelity (Wi-Fi) system, a wireless relay node, a wireless backhaul node, a transmission and reception point (TRP) or transmission point, TP), or the like; or may be a gNB in a 5G system, for example, an NR system, or a TRP or TP, or one or a group of (including a plurality of antenna panels) antenna panels of a base station in a 5G system; or may be a network node that forms a gNB or a transmission point, for example, a BBU or a distributed unit (DU).

The terminal device is also referred to as user equipment (UE), a mobile station (MS), a mobile terminal (MT), or the like, and is a device that provides a user with voice and/or data connectivity. For example, the terminal device is a handheld device, a vehicle-mounted device, or the like that has a wireless connection function. Currently, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home.

(1) The Following Describes Several Scenarios of Triggering Random Access:

Scenario 1: The terminal device initially establishes a radio resource control (RRC) connection. When the terminal device switches from an idle state to a connected state, the terminal device initiates random access.

Scenario 2: The terminal device reestablishes an RRC connection. When the terminal device needs to reestablish an RRC connection after a wireless connection fails, the terminal device initiates random access.

Scenario 3: When the terminal device performs cell handover, the terminal device initiates random access in a target cell.

Scenario 4: Downlink data arrives. When the terminal device is in a connected state, and the network device needs to transmit downlink data to the terminal device but finds that the terminal device is out of uplink synchronization, the network device controls the terminal device to initiate random access. The network device maintains an uplink timer. If the uplink timer expires and the network device does not receive a response signal of the terminal device, the network device considers that the terminal device is out of uplink synchronization.

Scenario 5: Uplink data arrives. When the terminal device is in a connected state, and the terminal device needs to transmit uplink data to the network device but finds that the network device is in an uplink out-of-synchronization state, the terminal device initiates random access. The terminal device maintains an uplink timer. If the uplink timer expires and the terminal device does not receive a command for adjusting a TA value from the network device, the terminal device considers that the network device is out of uplink synchronization.

(2) Four-Step Random Access (4-Step RA)

Figure 2:
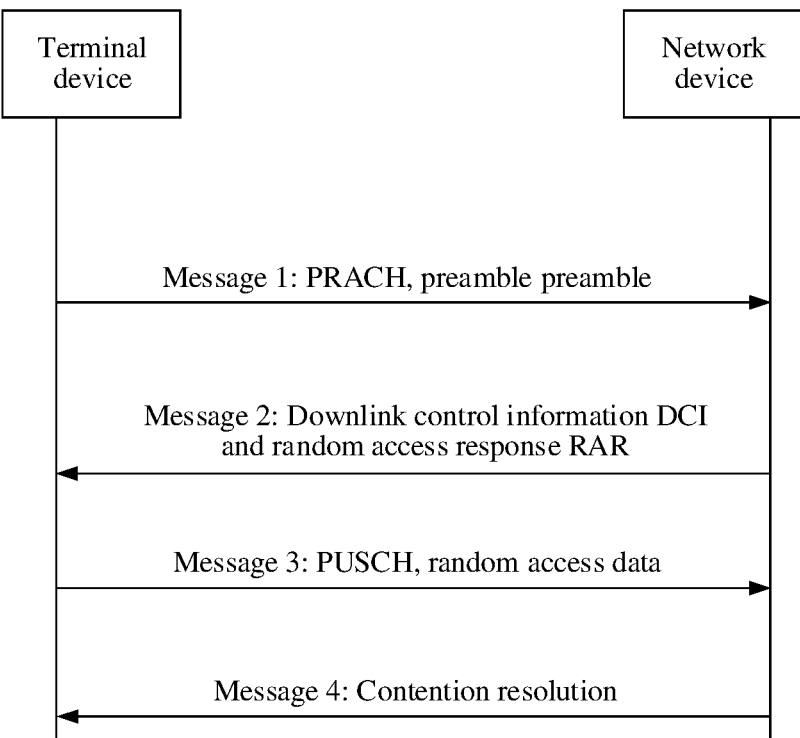
FIG. 2 is a schematic diagram of 4-step random access (4-step RA) according to an embodiment of the present disclosure.

In four-step random access (4-step RA) shown in FIG. 2, before the terminal device performs random access, the network device performs configuration for the terminal device, including but not limited to configuring a preamble set and a time-frequency resource for sending a message 1 (Msg1). The four-step random access includes the following steps:

First, the terminal device sends a message 1 (Msg1) to the network device, and correspondingly, the network device receives the message 1 from the terminal device.

The terminal device sends the message 1 to the network device on a physical random access channel (PRACH) (referred to as a random access channel (RACH) below). For example, the terminal device sends the message 1 on a pre-configured time-frequency resource, where the message 1 includes a random access preamble, and the random access preamble includes any preamble selected by the terminal device from a preamble set configured by the network device.

The network device then sends a message 2 (Msg2) to the terminal device, and correspondingly, the terminal device receives the message 2 from the network device.

For example, the network device sends the message 2 based on the message 1, where the message 2 includes a random access response (RAR). Before sending the message 2 to the terminal, the network device needs to first send downlink control information (DCI) used to schedule the message 2. The network device determines, based on the time-frequency resource of the message 1, a radio network temporary identifier (RNTI) used to scramble the DCI, which may be, for example, a random access radio network temporary identifier (RA-RNTI). The network device carries the identifier of the received preamble and an uplink grant used to schedule a message 3 in the message 2, and sends the message 2 to the terminal device. The message 2 is carried on a PDSCH channel, and a scrambling code sequence used to scramble the PDSCH may be generated based on the RA-RNTI. When receiving the message 2, the terminal device first determines the RA-RNTI by using the same method, descrambles the received DCI by using the RA-RNTI, receives the PDSCH based on the received DCI, and obtains the message 2.

Next, the terminal device sends a message 3 (Msg3) to the network device, and correspondingly, the network device receives the message 3 from the terminal device.

The terminal device sends the message 3 to the network device on a physical uplink shared channel (PUSCH).

For example, if the terminal device parses out, from the received message 2, the identifier of the preamble sent by the terminal device, it is considered that the preamble sent by the terminal device is received by the network device. The terminal device may send the message 3 based on the uplink grant carried in the message 2, where the message 3 includes a demodulation reference signal (DMRS) and random access data such as control plane data and/or user name data, and the random access data includes an identifier (UE-ID) of the terminal device.

In addition, the network device sends a message 4 (Msg4) to the terminal device, and correspondingly, the terminal device receives the message 4 from the network device.

The message 4 may alternatively be understood as a contention resolution message.

For example, because interference is generated when a plurality of terminal devices send the message 3 on the same time-frequency resource, the network device demodulates a message 3 sent by one of the terminal devices, and sends a message 4 to the terminal device. The message 4 includes a demodulated identifier of the terminal device, and the message 4 indicates a terminal device that completes a random access process.

All terminal devices that send the message 3 receive the message 4. The terminal device matches an identifier of the terminal device in the message 4 with an identifier of the terminal device. A terminal device that successfully matches the identifier of the terminal device is a terminal device that successfully performs random access.

In addition, the message 4 may also carry control plane data and/or user name data. When the message 3 or the message 4 carries user plane data, the 4-step RA may also be referred to as early data transmission (EDT).

If the terminal device does not receive, in a preset time window, the message 2 that corresponds to the terminal device and that is fed back by the network device, the terminal device may resend the message 1.

(3) Two-Step Random Access (2-Step RA)

Figure 3:
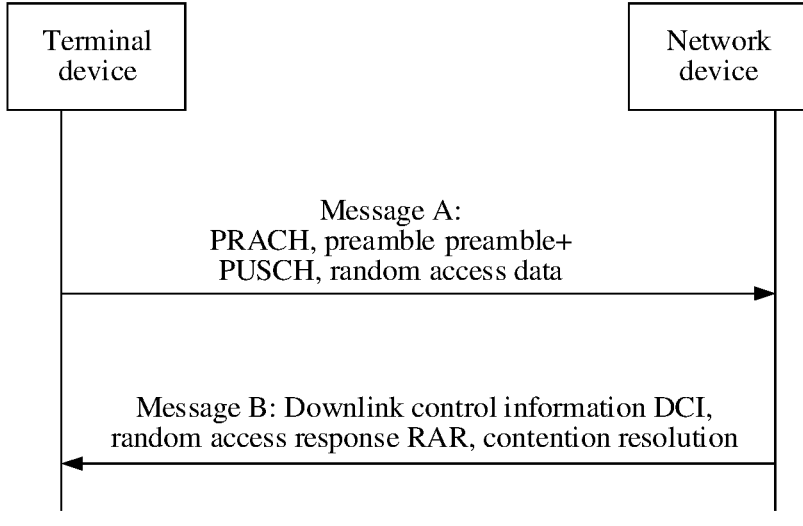
FIG. 3 is a schematic diagram of 2-step random access (2-step RA) according to an embodiment of the present disclosure.

In two-step random access (2-step RA) shown in FIG. 3, before the terminal device performs random access, the network device performs configuration for the terminal device, including but not limited to configuring a preamble set and a time-frequency resource for sending a message A (msgA). The two-step random access includes the following steps:

First, the terminal device sends a msgA to the network device, and correspondingly, the network device receives the message A from the terminal device.

The MsgA is formed by a physical random access channel (PRACH) and a physical uplink shared channel (PUSCH), where the PRACH is used to send a random access preamble, and the PUSCH is used to send control plane and/or user plane data, and may further send a DMRS.

For example, the terminal device sends the message A on a pre-configured time-frequency resource, where the message A includes a random access preamble and random access data, the random access preamble includes any preamble selected by the terminal device from a preamble set configured by the network device, and the random access data is, for example, control plane data and/or user name data, including, for example, an identifier UE-ID of the terminal device.

Step 2: The network device sends a message B to the terminal device, and correspondingly, the terminal device receives the message B from the network device.

For example, the message B includes an RAR of the network device for the message A. If the network device correctly decodes the PUSCH in the message A, the message B includes a success RAR that carries a contention resolution message. If the network device does not correctly decode the PUSCH, the message B includes a fallback RAR. After receiving the fallback RAR, the terminal falls back to 4-step RA based on an uplink grant carried in the fallback RAR, and sends a message 3 to the network device. Before sending the message B to the terminal device, the network device needs to first send DCI used to schedule the message B. The network device determines, based on a time-frequency resource of the message A, an RNTI used to scramble the DCI, which may be, for example, a MsgB-RNTI. If the network device sends a fallback RAR, the network device carries an identifier of a received preamble and an uplink grant used to schedule the message 3 in the message B, and sends the message to the terminal device. If the network device sends a success RAR, the network device carries the contention resolution message in the message B, and sends the message to the terminal. The message B is carried on the PDSCH, and a scrambling code sequence used to scramble the PDSCH may be generated based on the MsgB-RNTI. When receiving the message B, the terminal device first determines the MsgB-RNTI by using the same method, descrambles the received DCI by using the MsgB-RNTI, receives the PDSCH based on the received DCI, and obtains the message B.

In the 2-step RA, because different preambles are orthogonal to each other, when the terminal device randomly selects a preamble for sending, a probability of a preamble sending failure is far less than a probability of a data sending failure. When the network device successfully receives the random access preamble but does not receive the random access data, the network device may fall back 2-step RA to 4-step RA. To be specific, the network device returns, based on the successfully received preamble, a fallback RAR that carries an uplink grant, and the terminal device resends the random access data based on the uplink grant.

(4) One PRACH time-frequency resource may be referred to as a physical random access channel occasion (RO), and a combination of an RO and a Preamble may be referred to as a PRE. Different PREs may be understood as: different ROs and same Preambles; or same ROs and different Preambles; or different ROs and different Preambles.

The terminal device may select a PRE, and the terminal device sends, on a PRACH time-frequency resource corresponding to the selected PRE, a Preamble corresponding to the selected PRE.

One PUSCH time-frequency resource may be referred to as one physical uplink shared channel occasion (PO), and a combination of one PO and one DMRS (which may be understood as a DMRS resource, where the DMRS resource includes a DMRS sequence and a DMRS port) may be referred to as one PRU. Different PRUs may be understood as: different POs and same DMRSs; or same POs and different DMRSs; or different POs and different DMRSs.

The terminal device may select a PRU, and the terminal device sends, on a PUSCH time-frequency resource corresponding to the selected PRU, a DMRS corresponding to the selected PRU. Optionally, data may be further sent.

(5). An SS/PBCH block is introduced into 5G NR, and the SS/PBCH block may be referred to as an SSB for short. The network device sends a plurality of SSBs in one period in a scanning manner, and different SSBs correspond to different spatial directions (for example, correspond to different beams). A quantity of SSBs is configured by the network device for the terminal device by using a system message. NR supports three types of SSB quantities: 4, 8, and 64. Generally, a higher frequency indicates a larger quantity of SSBs and narrower beams for sending the SSBs.

The terminal device performs RSRP measurement on the SSBs sent by the network device. When an RSRP measurement result of an SSB is greater than or equal to a preset threshold, the terminal device may select a PRE to which the SSB is mapped, to perform a random access (RA) process. Currently, a mapping relationship between SSBs and ROs may be one-to-many, one-to-one, or many-to-one. A mapping relationship between SSBs and PREs may be one-to-many or one-to-one. Currently, a many-to-one mapping relationship between SSBs and PREs is not supported.

When performing 2-step RA or 4-step RA, the terminal device implicitly notifies the network device of a selected SSB by using a selected PRE (for example, an RO in the PRE). When sending a response message (MsgB or Msg2), the network device may send the response message by using a beam corresponding to the SSB selected by the terminal device. In this way, when receiving the response message, the terminal device receives the response message by using a quasi co-location (QCL) feature (for example, a spatial receiving parameter) the same as that of the selected SSB. The QCL feature may also be referred to as a QCL relationship. The QCL relationship means that two reference signals have some same spatial parameters.

In this way, implicit indication of the SSB can be implemented by using an RACH, so that the network device preliminarily determines a location of the terminal device, to perform more accurate beam management on the terminal device.

(6). As described above, in 5G NR, there is a mapping relationship between ROs and SSBs, and the terminal implicitly notifies the network device of the selected SSB by using the selected RO.

Figure 4:
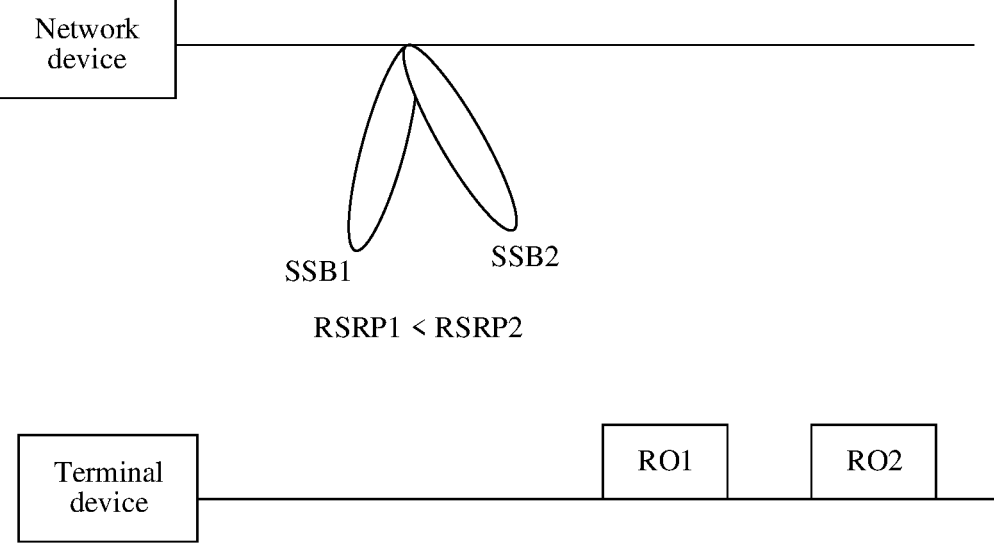
FIG. 4 is a schematic diagram of a beam according to an embodiment of the present disclosure.

Different ROs to which different SSBs are mapped may be in time division. For example, as shown in FIG. 4, an SSB1 and an SSB2 are respectively mapped to an RO1 and an RO2. It is assumed that RSRP measurement results of both the SSB1 and the SSB2 are greater than or equal to a preset threshold, and the measurement result (RSRP2) of the SSB2 is better than the measurement result (RSRP1) of the SSB1. In this case, to trigger random access as early as possible and reduce an access delay, the terminal device may select the RO1. However, because the selected SSB is not an optimal SSB, reliability is reduced. Alternatively, the terminal device may select the RO2 to improve reliability, so that the access delay is increased. In this case, the delay and the reliability of random access cannot be considered. This case is more common in a high-frequency scenario such as a millimeter wave or a terahertz (THz) scenario. This is because a high-frequency beam is narrow, a quantity of SSBs is larger, and there is a higher probability that different SSBs need to be mapped to ROs located in different time domain positions.

A solution is as follows: When the terminal device selects, to reduce an access delay, an RO to which a second optimal SSB is mapped, uplink control information (UCI) may be carried in the message A of 2-step RA (or the message 3 of 4-step RA), to indicate an optimal or better SSB. The UCI may be carried on an uplink control channel (PUCCH) or a PUSCH.

The network device can obtain the carried indication information only when the network device correctly receives and decodes the message A (or the message 3). If the network device detects the MsgA (for example, detects the Preamble and the DMRS) (or the message 3) but does not correctly decode the PUSCH or the PUCCH (or the message 3), the network device can learn only the SSB (for example, the SSB1) to which the RO selected by the terminal device is mapped, but does not learn the SSB indicated by the terminal device. In this case, the delay and the reliability of random access still cannot be considered.

The following describes a plurality of technical solutions, so that the delay and the reliability of random access can be considered. In the technical solutions described below, a mapping relationship between PREs and SSBs is one-to-many. In other words, one PRE is mapped to a plurality of SSBs. A mapping relationship between PREs and PRUs is one-to-many. In other words, one PRE is mapped to a plurality of PRUs.

In one aspect, one PRE (for example, an RO in the PRE) is mapped to a plurality of SSBs, so that a scanning period of the SSBs is shortened, and the terminal device can find an SSB with an optimal RSRP as soon as possible, thereby reducing a random access delay. In another aspect, the terminal device may select one PRE from a plurality of PREs, and implicitly indicate, by using the selected PRE (for example, an RO in the PRE), an SSB group selected by the terminal device. The terminal device then selects one PRU from a plurality of PRUs to which the selected PRE is mapped, and implicitly indicates a better SSB in the SSB group by using the selected PRU (for example, a PO in the PRU). When the network device detects a PUSCH, even if the network device cannot correctly decode the PUSCH, the network device may learn of a better SSB than the SSB indicated by the PRE. In this way, a beam used during subsequent communication between the network device and the terminal is more accurate, and communication reliability is improved.

The solution is described in detail with reference to the accompanying drawings. Features or content denoted by dashed lines in the accompanying drawings may be understood as optional operations or optional structures in embodiments of the present disclosure.

Mutual reference may be made between technical details of the plurality of embodiments described below. The plurality of embodiments may be used as one embodiment separately, or may be combined with other embodiments as one embodiment.

Embodiment 1

An SSB indication method applied to a 2-step RA scenario is provided.

Figures 5, 6:
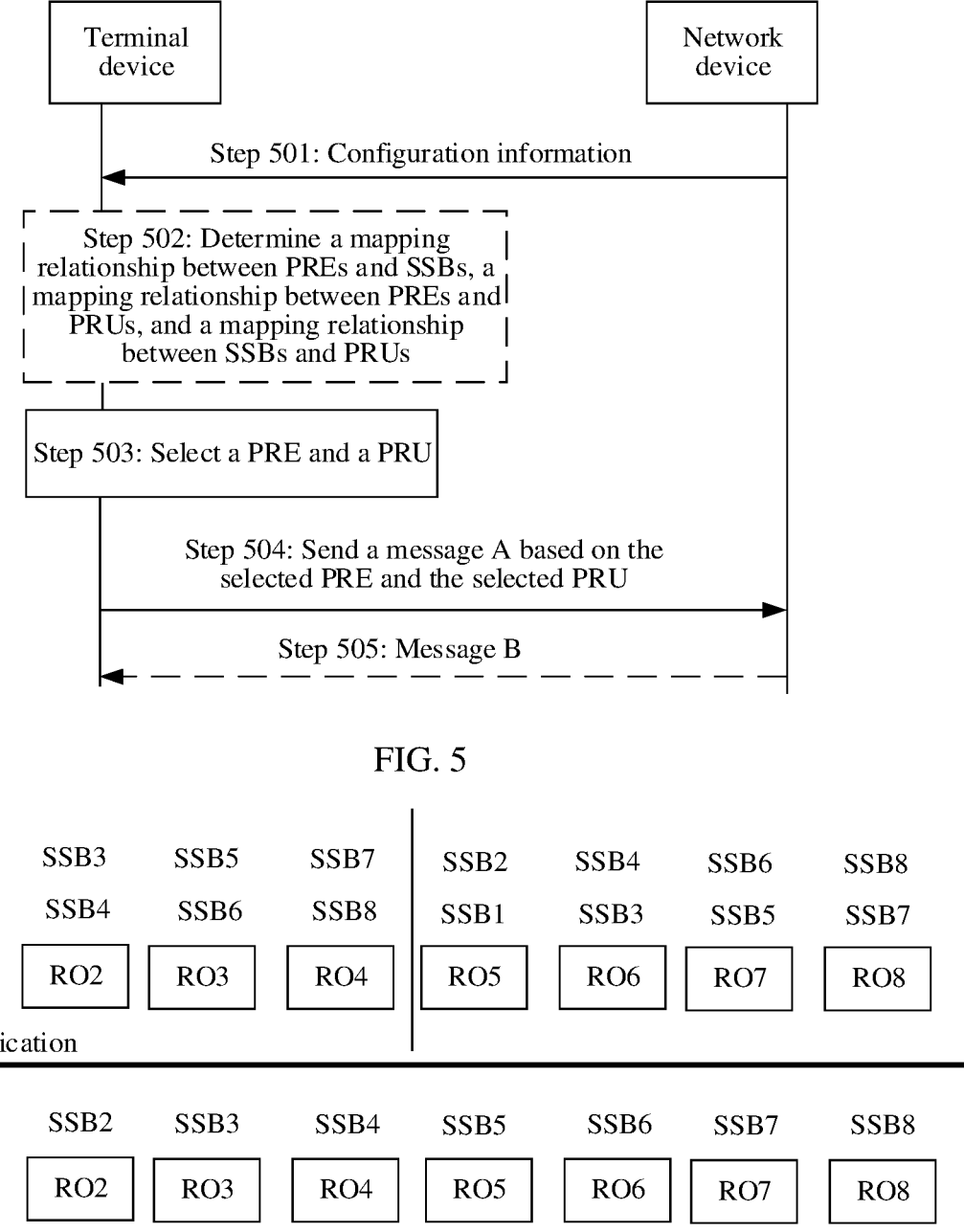
FIG. 5 is a schematic diagram of a communication process according to an embodiment of the present disclosure.
FIG. 6 is a schematic diagram of mapping between an RO and an SSB according to an embodiment of the present disclosure.

As shown in FIG. 5, a schematic diagram of a communication process is provided, including the following steps:

Step 501: A network device sends configuration information to a terminal device, and correspondingly, the terminal device receives the configuration information from the network device.

In an example, the configuration information indicates one or more of the following:

a quantity S of first combinations, a quantity W of second combinations, a quantity mapping relationship (for example, a quantity M of downlink reference signals to which one first combination is mapped) between a first combination and downlink reference signals, a quantity mapping relationship (for example, a quantity N of second combinations to which one first combination is mapped) between a first combination and second combinations, and a quantity mapping relationship between downlink reference signals and second combinations. S, W, M, and N are all integers greater than or equal to 2.

Such information may be included in one message, or may be included in a plurality of messages. Such mapping relationships are quantity mapping relationships, and do not indicate specific content mapping relationships between a specific first combination, a specific downlink reference signal, and a specific second combination.

One first combination may include one random access channel occasion (RO) and one preamble. The first combination may be a PRE. For different first combinations, ROs are the same and preambles are different; or ROs are different and preambles are the same; or ROs are different and preambles are different.

One second combination may include one physical uplink shared channel occasion (PO) and one uplink reference signal. The second combination may be a PRU. For different second combinations, POs are the same and uplink reference signals are different; or POs are different and uplink reference signals are the same; or POs are different and uplink reference signals are different.

The uplink reference signal may be a DMRS or another uplink reference signal.

The downlink reference signal may be an SSB or another downlink reference signal.

In a current technology, a mapping relationship between PREs and SSBs is one-to-one or many-to-one. However, in the present disclosure, the mapping relationship between the PREs and the SSBs is one-to-many. In other words, one PRE is mapped to a plurality of SSBs. In the current technology, a mapping relationship between PREs and PRUs is one-to-one or many-to-one. However, in the present disclosure, the mapping relationship between the PREs and the PRUs is one-to-many. In other words, one PRE is mapped to a plurality of PRUs.

In one aspect, one PRE (for example, an RO in the PRE) is mapped to a plurality of SSBs, so that a scanning period of the SSBs is shortened, and the terminal device can find an SSB with an optimal RSRP as soon as possible, thereby reducing a random access delay. As shown in FIG. 6, it is assumed that there are eight SSBs (SSB1 to SSB8) in total. In the current technology, a PRE (for example, an RO in the PRE) and an SSB are in a one-to-one mapping relationship. In this case, the eight SSBs need to be mapped to eight ROs (RO1 to RO8), and the eight ROs may be understood as eight PREs in time domain. In the present disclosure, the PRE and the SSB are in a one-to-many mapping relationship. If one RO is mapped to two SSBs, eight SSBs are mapped to four ROs (RO1 to RO4), and the four ROs may be understood as four PREs in time domain. It is assumed that RSRPs of the SSB1 and the SSB2 are higher than a threshold, and the SSB1 is better than the SSB2. When data arrives after the PRE4, the UE selects the PRE5 and the PRU corresponding to the SSB1.

In another aspect, the terminal device may select one PRE from a plurality of PREs, and implicitly indicate, by using the selected PRE (for example, an RO in the PRE), an SSB group selected by the terminal device. The terminal device then selects one PRU from a plurality of PRUs to which the selected PRE is mapped, and implicitly indicates a better SSB in the SSB group by using the selected PRU (for example, a PO in the PRU). When the network device detects a PUSCH, even if the network device cannot correctly decode the PUSCH, the network device may learn of a better SSB than the SSB indicated by the PRE. In this way, a beam used during subsequent communication between the network device and the terminal is more accurate, and communication reliability is improved.

In an example, the configuration information may explicitly indicate a quantity S of first combinations (for example, PREs); or the configuration information does not explicitly indicate the quantity S, but includes information for configuring the following content: time-frequency resource locations and/or a quantity of ROs, and a quantity of preambles. Generally, the quantity of preambles is a quantity of Preambles on each RO.

The terminal device may determine the quantity S of PREs (S>1) based on a quantity of ROs (namely, PRACH time-frequency resources) and a quantity of Preambles on each RO. For example, S=the quantity of ROs*the quantity of Preambles on each RO.

In an example, the configuration information may explicitly indicate a quantity W of second combinations (for example, PRUs); or the configuration information does not explicitly indicate the quantity W, but includes information for configuring the following content: time-frequency resource locations and/or a quantity of POs, and a quantity of DMRS resources. For example, the quantity of DMRS resources is indicated by information such as a quantity of DMRS ports and a quantity of sequences of each DMRS port. For example, the quantity of DMRS resources=the quantity of DMRS ports*the quantity of sequences of each DMRS port.

The terminal device may determine the quantity W of PRUs (W>1) based on the quantity of POs and the quantity of DMRS resources on each PO. For example, W=the quantity of POs*the quantity of DMRS resources on each PO.

In an example, the configuration information may explicitly indicate a quantity M (for example, a quantity of SSBs to which each PRE is mapped) of downlink reference signals to which one first combination is mapped. Alternatively, the configuration information does not explicitly indicate the quantity M, but includes information for configuring the following content: a quantity of downlink reference signals to which each RO is mapped and a quantity of preambles to which each downlink reference signal is mapped. It may be understood that a quantity of preambles to which each downlink reference signal is mapped may be replaced with a quantity of downlink reference signals to which each preamble is mapped.

The terminal device may determine, based on the quantity of downlink reference signals to which each RO is mapped and the quantity of preambles to which each downlink reference signal is mapped, the quantity M of downlink reference signals to which the first combination is mapped.

In an example, the configuration information may explicitly indicate a quantity N (for example, a quantity of PRUs to which each PRE is mapped) of second combinations to which one first combination is mapped. Alternatively, the configuration information does not explicitly indicate the quantity N, and the terminal device may further determine N based on the total quantity S of PREs and the total quantity W of PRUs. For example, N=W/S, for example, N=floor (W/S), where floor represents rounding down; or N=ceil (W/S), where ceil represents rounding up. For example, there are two PRUs and two PREs, and the PREs and the PRUs are in a one-to-one relationship. For example, there are two PRUs and four PREs, and one PRU corresponds to two PREs. For example, there are six PRUs and three PREs, and two PRUs correspond to one PRE.

In an example, the configuration information may explicitly indicate a quantity mapping relationship (for example, a quantity of PRUs to which each SSB can be mapped) between downlink reference signals and second combinations, or the configuration information does not explicitly indicate the quantity, and the terminal device determines the quantity mapping relationship between the downlink reference signals and the second combinations. For example, the terminal device may determine the quantity based on M and N. For example, when M is greater than or equal to N, each PRU is mapped to M/N, floor (M/N), or ceil (M/N) SSBs. For example, when M is less than N, each SSB is mapped to N/M, floor (N/M), or ceil (N/M) PRUs.

A mapping relationship between SSBs in an SSB group to which a PRE is mapped and PRUs in a PRU group to which the PRE is mapped may be one-to-one, many-to-one, or one-to-many.

In an optional example, the configuration information further indicates one or more of the following: S first combinations, W second combinations, a mapping relationship between a first combination and downlink reference signals, a mapping relationship between a first combination and second combinations, and a mapping relationship between second combinations and downlink reference signals. Such mapping relationships are specific content mapping relationships. Such information may be included in one message, or may be included in a plurality of messages.

The mapping relationship between the first combination and the downlink reference signals is, for example, M downlink reference signals (where the M downlink reference signals may be considered as a group of downlink reference signals SSBs) to which each first combination is mapped.

The mapping relationship between the first combination and the second combinations is, for example, N second combinations (where the N second combinations may be considered as a group of second combinations PRUs) to which each first combination is mapped.

The mapping relationship between the second combinations and the downlink reference signals is, for example, a mapping relationship between M downlink reference signals to which any first combination is mapped and N second combinations to which the first combination is mapped.

In an optional example, the configuration information may be further used to configure a downlink reference signal (for example, an SSB) measurement threshold, for example, an RSRP threshold.

The configuration information in step 501 may be carried in a RRC message (for example, a system message or a UE-specific RRC message), or a physical downlink control channel (PDCCH) or a media access control (MAC) control element (CE). In other words, the network device delivers the configuration information to the terminal device by using the RRC, the PDCCH, or the MAC CE.

Optionally, step 502 includes: The terminal device determines one or more of the following based on the configuration information: first combinations, second combinations, a mapping relationship between a first combination and downlink reference signals, a mapping relationship between a first combination and second combinations, and a mapping relationship between downlink reference signals and second combinations.

It may be understood that the network device also needs to determine the information in step 502, and a result determined by the network device is the same as a result determined by the terminal device. The following describes in detail a process of determining each piece of information.

(1) Determine first combinations.

For example, determining S first combinations may be understood as: determining an RO and a preamble that are included in each first combination of the S first combinations. For example, the S first combinations are determined in ascending order of first preamble indexes, then RO frequency domain indexes, and finally RO time domain indexes. For example, the preamble indexes are 0 to 2, the RO frequency domain indexes are 0 to 2, and the RO time domain indexes are 0 to 2. A total of 3*3*3=27 first combinations can be obtained.

In addition, it may be understood that a sequence of ascending according to the preamble indexes, ascending according to the RO frequency domain resource indexes, and ascending according to the RO time domain resource indexes may change randomly.

In addition, "ascending" may alternatively be replaced with "descending".

For example, in the 1st first combination, a preamble index is 0, an RO frequency domain index is 0, and an RO time domain index is 0;

in the 2nd first combination, a preamble index is 1, an RO frequency domain index is 0, and an RO time domain index is 0;

in the 3rd first combination, a preamble index is 2, an RO frequency domain index is 0, and an RO time domain index is 0;

in the 4th first combination, a preamble index is 0, an RO frequency domain index is 1, and an RO time domain index is 0;

in the 5th first combination, a preamble index is 1, an RO frequency domain index is 1, and an RO time domain index is 0;

in the 6th first combination, a preamble index is 2, an RO frequency domain index is 1, and an RO time domain index is 0;

in the 7th first combination, a preamble index is 0, an RO frequency domain index is 2, and an RO time domain index is 0;

in the 8th first combination, a preamble index is 1, an RO frequency domain index is 2, and an RO time domain index is 0;

in the 9th first combination, a preamble index is 2, an RO frequency domain index is 2, and an RO time domain index is 0;

in the 10th first combination, a preamble index is 0, an RO frequency domain index is 0, and an RO time domain index is 1;

in the 11th first combination, a preamble index is 1, an RO frequency domain index is 0, and an RO time domain index is 1;

in the 12th first combination, a preamble index is 2, an RO frequency domain index is 0, and an RO time domain index is 1;

in the 13th first combination, a preamble index is 0, an RO frequency domain index is 1, and an RO time domain index is 1;

and so on.

(2) Determine second combinations.

For example, determining W second combinations may be understood as: determining a PO and an uplink reference signal resource (for example, an uplink reference signal DMRS) that are included in each second combination of the W second combinations. For example, the W second combinations are determined in ascending order of first PO frequency domain indexes, then DMRS resource indexes, and finally PO time domain indexes.

In addition, it may be understood that a sequence of ascending according to the DMRS resource indexes, ascending according to the PO frequency domain resource indexes, and ascending according to the PO time domain resource indexes may change randomly.

In addition, "ascending" may alternatively be replaced with "descending".

(3) Determine a mapping relationship between a first combination and downlink reference signals.

For example, determining M downlink reference signals (for example, M SSBs to which each PRE is mapped) to which each first combination is mapped may be understood as: determining M downlink reference signals to which an $s^{th}$ first combination is mapped, where s is an integer ranging from 1 to S.

A detailed description is provided below.

In an example a, the network device may configure, for the terminal device, a specific content mapping relationship between a first combination and downlink reference signals. For example, as described in step 501, the configuration information indicates M downlink reference signals to which each first combination is mapped. For example, indexes of M downlink reference signals to which an $s^{th}$ first combination is mapped are configured. The terminal device may use the mapping relationship configured by the network device as the specific content mapping relationship that needs to be determined in step 502.

In another example b, the network device configures the quantity mapping relationship between the first combination and the downlink reference signals for the terminal device, but does not configure specific content of the mapping relationship. For example, as described in step 501, the configuration information indicates a quantity M of downlink reference signals to which one first combination is mapped. The terminal device may determine the specific content mapping relationship based on the quantity mapping relationship configured by the network device and an agreed mapping rule.

The agreed mapping rule may be: indexes of every M downlink reference signals are mapped in ascending order of PRE indexes. For example, downlink reference signal resources whose indexes are 1 to M are mapped to a PRE whose index is 1, downlink reference signal resources whose indexes are M+1 to 2M are mapped to a PRE whose index is 2, downlink reference signal resources whose indexes are 2M+1 to 3M are mapped to a PRE whose index is 3, and so on.

Another agreed mapping rule may be: indexes of every M reference signals are mapped to one PRE in the following order: first, mapping in ascending order of preamble indexes on one RO; second, mapping in ascending order of frequency domain indexes of a plurality of ROs in frequency division; and third, mapping in ascending order of time domain indexes of a plurality of ROs in time division.

In the foregoing rule, a sequence of ascending according to the frequency domain resource indexes of the RO, ascending according to the preamble indexes, and ascending according to the time domain resource indexes of the RO may change randomly.

In addition, "ascending" may alternatively be replaced with "descending".

(4) Determine a mapping relationship between a first combination and second combinations.

In an optional example, downlink reference signals to which different first combinations are mapped are different. In other words, there is no intersection set between second combinations to which different first combinations are mapped.

For example, determining N second combinations (for example, N PRUs to which each PRE is mapped) to which each first combination is mapped may be understood as follows: The terminal device determines N second combinations to which the $s^{th}$ first combination is mapped, where s is an integer ranging from 1 to S.

A detailed description is provided below.

In an example a, the network device may configure, for the terminal device, a mapping relationship between a first combination and second combinations. For example, as described in step 501, the configuration information indicates N second combinations to which each first combination is mapped. For example, indexes of N second combinations to which an $s^{th}$ first combination is mapped are configured. The terminal device may use the mapping relationship configured by the network device as the specific content mapping relationship that needs to be determined in step 502.

In another example b, the network device configures the quantity mapping relationship between the first combination and the second combinations for the terminal device, but does not configure specific content of the mapping relationship. For example, as described in step 501, the configuration information indicates a quantity N of second combinations to which one first combination is mapped. The terminal device may determine the specific content mapping relationship based on the quantity mapping relationship configured by the network device and an agreed mapping rule.

The agreed mapping rule may be: indexes of every N second combinations are mapped in ascending order of PRE indexes. For example, second combinations whose indexes are 1 to N are mapped to a PRE whose index is 1, second combinations whose indexes are N+1 to 2N are mapped to a PRE whose index is 2, and second combinations whose indexes are 2N+1 to 3N are mapped to a PRE whose index is 3, and so on.

Another agreed mapping rule may be: (for example, in ascending order of first combination indexes) mapping an index of each first combination to N second combinations in the following order: first, mapping in ascending order of frequency domain indexes of a plurality of POs in frequency division; second, mapping in ascending order of DMRS resource indexes; and third, mapping in ascending order of time domain indexes of a plurality of POs in time division. Optionally, the DMRS resource indexes are determined in ascending order of first DMRS port numbers and then DMRS sequence indexes.

Still another agreed mapping rule may be: determining a plurality of PREs in ascending order of first preamble indexes, then RO frequency domain resource indexes, and finally RO time domain resource indexes. Each PRE is then mapped to N second combinations in the following order:

first, mapping in ascending order of frequency domain indexes of a plurality of POs in frequency division; second, mapping in ascending order of DMRS resource indexes; and third, mapping in ascending order of time domain indexes of a plurality of POs in time division. Optionally, the DMRS resource indexes are determined in ascending order of first DMRS port numbers and then DMRS sequence indexes.

In the foregoing rule, a sequence of ascending according to the preamble indexes, ascending according to the RO frequency domain resource indexes, and ascending according to the RO time domain resource indexes may change randomly; and a sequence of ascending according to the frequency domain resource indexes of the PO, ascending according to the DMRS resource indexes, and ascending according to the time domain resource indexes of the PO may also change randomly. In addition, "ascending" may alternatively be replaced with "descending".

With reference to the example a in (3) and the example a in (4), it may be understood that the configuration information is a multi-level SSB indication with reference to a PRE and a PRU.

The configuration information includes a first-level indication: a one-to-many mapping relationship between a PRE and SSBs. In other words, one PRE is mapped to a group of SSBs (in the current technology, a mapping relationship between PREs and SSBs is one-to-one or many-to-one). Subsequently, the terminal device implicitly indicates the selected SSB group by using the selected PRE (for example, an RO in the PRE).

The configuration information includes a second-level indication: a one-to-many mapping relationship between PREs and PRUs. In other words, one PRE is mapped to a group of PRUs (in the current technology, a mapping relationship between PREs and PRUs is one-to-one or many-to-one). Subsequently, the terminal device further implicitly indicates one or more SSBs in the selected SSB group by using the selected PRU (for example, a PO in the PRU).

Optionally, a mapping relationship between SSBs in an SSB group to which a PRE is mapped and PRUs in a PRU group to which the PRE is mapped may be one-to-one, many-to-one, or one-to-many.

(5) Determine a mapping relationship between downlink reference signals and second combinations.

For example, determining a mapping relationship between M downlink reference signals to which any first combination is mapped and N second combinations to which the first combination is mapped may be understood as: determining a mapping relationship between the M downlink reference signals (for example, SSBs) to which the $s^{th}$ first combination is mapped and the N second combinations, where s is an integer ranging from 1 to S. For example, a one-to-one, one-to-many, or many-to-one mapping relationship between the M SSBs to which each PRE is mapped and the N PRUs is determined.

A detailed description is provided below.

As described above, for example, when M is greater than or equal to N, each PRU is mapped to M/N, floor (M/N), or ceil (M/N) SSBs. For example, when M is less than N, each SSB is mapped to N/M, floor (N/M), or ceil (N/M) PRUs.

For example, M is 2, N is 2, and one SSB is mapped to one PRU.

For example, when M is 4 and N is 2, two SSBs are mapped to one PRU.

For example, when M is 5 and N is 2, for example, one PRU is mapped to three SSBs, and the other PRU is mapped to two SSBs. Alternatively, every three SSBs are mapped to one PRU (one SSB may be mapped to two PRUs).

For example, when M is 2 and N is 4, every two PRUs are mapped to one SSB.

For example, when M is 2 and N is 5, for example, one SSB is mapped to two PRUs (there may be no SSB that can be mapped to one PRU). Alternatively, one SSB is mapped to three PRUs. Alternatively, one SSB is mapped to two PRUs, and the other SSB is mapped to three PRUs.

For example, when one downlink reference signal is mapped to P (P≥1) second combinations, the mapping relationship may be: mapping an index of each downlink reference signal in the M downlink reference signals to the P second combinations, for example, mapping the index of each downlink reference signal in the M downlink reference signals to the P second combinations with consecutive indexes in ascending order of the downlink reference signal indexes.

When one downlink reference signal is mapped to P (P≥1) second combinations, the mapping relationship may alternatively be: (for example, in ascending order of downlink reference signal indexes) mapping an index of each downlink reference signal in the M downlink reference signals to the P second combinations in the following order: first, mapping in ascending order of frequency domain indexes of a plurality of POs in frequency division; second, mapping in ascending order of DMRS resource indexes; and third, mapping in ascending order of time domain indexes of a plurality of POs in time division. Optionally, the DMRS resource indexes may be determined in ascending order of first DMRS port numbers and then DMRS sequence indexes. In this rule, a sequence of ascending according to the frequency domain resource indexes of the PO, ascending according to the DMRS resource indexes, and ascending according to the time domain resource indexes of the PO may also change randomly. In addition, "ascending" may alternatively be replaced with "descending".

When P (P>1) downlink reference signals are mapped to one second combination, the mapping relationship may be: mapping indexes of every P downlink reference signals in the M downlink reference signals to one second combination of the N second combinations, for example, mapping indexes of every P downlink reference signals in ascending order of downlink reference information indexes to one second combination in ascending order of second combination indexes.

When P (P>1) downlink reference signals are mapped to one second combination, the mapping relationship may alternatively be: (for example, in ascending order of downlink reference signal indexes) mapping an index of each downlink reference signal in the M downlink reference signals to the P second combinations in the following order: first, mapping in ascending order of frequency domain indexes of a plurality of POs in frequency division; second, mapping in ascending order of DMRS resource indexes; and third, mapping in ascending order of time domain indexes of a plurality of POs in time division. Optionally, the DMRS resource indexes may be determined in ascending order of first DMRS port numbers and then DMRS sequence indexes. In the foregoing rule, a sequence of ascending according to the frequency domain resource indexes of the PO, ascending according to the DMRS resource indexes, and ascending according to the time domain resource indexes of the PO may also change randomly. In addition, "ascending" may alternatively be replaced with "descending".

Step 503: The terminal device selects a first combination (for example, a PRE), and selects a second combination (for example, a PRU).

The selected first combination (for example, an RO in the first combination) is used to implicitly indicate a plurality of SSBs (namely, a group of SSBs) selected by the terminal device, and the selected second combination (for example, a PO in the second combination) is used to implicitly indicate an optimal SSB (for example, one or more SSBs) in the selected plurality of SSBs.

The terminal device may select the first combination from only an available first combination set, and select the second combination from an available second combination set. "Available" herein means that an RO in the available first combination may be used to send a Preamble, and a PO in the available second combination may be used to send a DMRS and random access data. The DMRS sent by the terminal device is a DMRS sequence.

(a) The Terminal Device Selects a First Combination (for Example, a PRE):

For example, the terminal device selects the first combination based on a mapping relationship between downlink reference signals and a first combination.

For example, the terminal device selects a PRE based on a many-to-one mapping relationship between SSBs and PREs.

In an example, a reference signal received power RSRP of at least one downlink reference signal in the M downlink reference signals (for example, SSBs) to which the first combination selected by the terminal device is mapped is greater than or equal to a preset threshold.

For example, the terminal device measures RSRPs of a plurality of SSBs. When an RSRP of an SSB is greater than or equal to the threshold, the terminal device may select a PRE to which the SSB (or an SSB group in which the SSB is located) is mapped.

Figure 7:
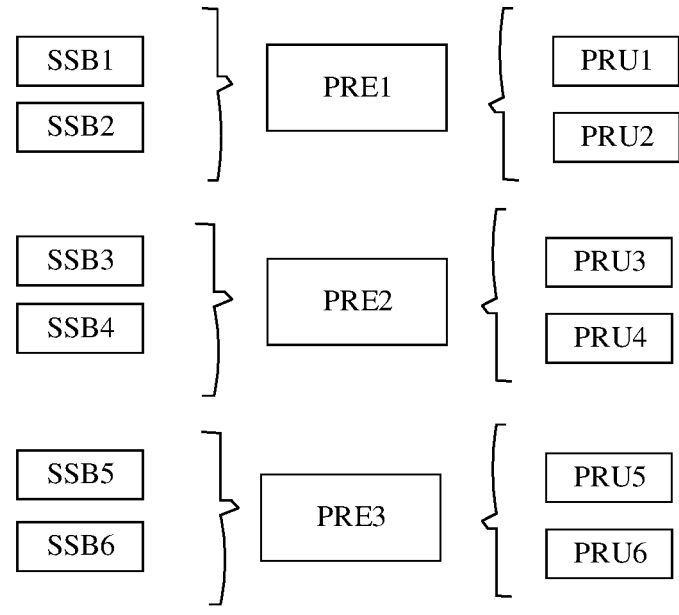
FIG. 7 is a schematic diagram of mapping of a PRE, a PRU, and an SSB according to an embodiment of the present disclosure.

As shown in FIG. 7, there are three PREs, which are respectively a PRE1, a PRE2, and a PRE3. Each PRE is mapped to two SSBs (two SSBs form a group, that is, there are three SSB groups, and one PRE is mapped to one SSB group). Three PREs are mapped to a total of six SSBs, namely, SSB1 to SSB6. In addition, there are six PRUs, which are PRU1 to PRU6, and each PRE is mapped to two PRUs. One PRU is mapped to one SSB. For example, an SSBi is mapped to a PRUi, where i is an integer greater than or equal to 1, and a value of i is an integer ranging from 1 to 6. The six SSBs herein may also be considered as three SSB groups, and each SSB group includes two SSBs. For any PRE, a $j^{th}$ SSB in an SSB group to which the PRE is mapped is mapped to a $j^{th}$ PRU in a plurality of PRUs to which the PRE is mapped.

The terminal device first selects, based on the RSRPs of the six SSBs, a PRE to which an SSB whose RSRP is greater than or equal to a specified threshold is mapped. For example, if RSRPs of the SSB2, the SSB3, and the SSB4 are greater than the specified threshold, and RSRPs of other SSBs are less than the specified threshold, the terminal device may select the PER1, or may select the PER2.

Optionally, a PRE to which an SSB with a largest RSRP (an optimal measurement result) is mapped is selected from a plurality of SSBs whose RSRPs are greater than or equal to the threshold. For example, if the RSRP of the SSB4 is the largest, the PRE2 to which the SSB4 is mapped may be selected.

In another optional example, in M downlink reference signals (for example, SSBs) to which the first combination selected by the terminal device is mapped, an RSRP of a default downlink reference signal is greater than or equal to a preset threshold.

Optionally, for any first combination, a default downlink reference signal (for example, a default SSB) is set in M downlink reference signals (for example, SSBs) to which the first combination is mapped. For example, a default SSB is set for each SSB group. The default downlink reference signal (for example, a default SSB) may be specified in a protocol. For example, it may be specified that a downlink reference signal with a smallest index, a downlink reference signal with a largest index, or a downlink reference signal that meets a condition in the M downlink reference signals is the default downlink reference signal. The default downlink reference signal (for example, a default SSB) may alternatively be configured by the network device for the terminal device, for example, configured in the configuration information in step 501, or may be configured in configuration information different from that in step 501. For example, a downlink reference signal with a smallest index, a downlink reference signal with a largest index, or a downlink reference signal that meets a condition may be configured as the default downlink reference signal.

The terminal device may determine a default downlink reference signal in M downlink reference signals to which each first combination is mapped. When determining that an RSRP measurement result of a default downlink reference signal (for example, a default SSB) in M downlink reference signals (for example, SSBs) to which a first combination is mapped is greater than or equal to a threshold, the terminal device selects the first combination. For example, the terminal device selects the first combination only when the RSRP of the default downlink reference signal in the plurality of downlink reference signals to which the first combination is mapped is greater than or equal to the threshold. FIG. 7 is still used as an example for description. An SSB with a smallest index is a default SSB. In other words, the SSB1, the SSB3, and the SSB5 are default SSBs. For example, if RSRPs of the SSB2, the SSB3, and the SSB4 are greater than the specified threshold, and an RSRP of a default SSB (namely, the SSB1) in the SSBs in which the SSB2 is located is less than the threshold, the PRE1 to which the SSB2 is mapped does not meet a requirement, and the PRE2 may be selected.

A default SSB is set in each SSB group. When the network device does not detect PUSCH transmission, it may be considered that the terminal device selects the default SSB, and sends a response message by using a QCL feature the same as that of the default SSB. The terminal device may also receive the response message by using a quasi co-location (QCL) feature the same as that of the default SSB.

In addition, when a default SSB is set in each SSB group, it is ensured as much as possible that default SSBs in different SSB groups are not repeated. As shown in FIG. 6, if one RO is mapped to two SSBs, eight SSBs are mapped to four ROs (RO1 to RO4, or RO5 to RO8), and the four ROs may be understood as four PREs in time domain. A smaller index in each group of SSBs to which the RO1 to the RO4 are mapped is a default SSB. For example, the SSB1, the SSB3, the SSB5, and the SSB7 are default SSBs. A larger index in each group of SSBs to which the RO5 to the RO8 are mapped is a default SSB. For example, the SSB2, the SSB4, the SSB6, and the SSB8 are default SSBs.

Advantages of such setting include: If the SSB1, the SSB3, the SSB5, and the SSB7 in the four groups of SSBs to which the RO1 to the RO4 are mapped are default SSBs, and the SSB1, the SSB3, the SSB5, and the SSB7 in the four groups of SSBs to which the RO5 to the RO8 are mapped are default SSBs. An SSB group corresponding to the RO1 is used as an example. The SSB2 is an optimal SSB in the SSB group, and the SSB1 is a default SSB in the SSB group. If the first combination is selected according to the rule that the RSRP of the default downlink reference signal is greater than or equal to the preset threshold in the M downlink reference signals (for example, SSBs) to which the selected first combination is mapped, the SSB group in which the SSB1 is located is never selected. Therefore, in the RO5, the SSB2 is used as the default SSB, so that a PRE corresponding to the SSB group is selected.

In an optional example, if RSRPs of all SSBs are not greater than or equal to the threshold, the terminal device may select a PRE to which an SSB with a largest RSRP is mapped. Alternatively, the terminal device does not select the PRE, and does not perform a subsequent operation.

In another optional example, when selecting the first combination, the terminal device may first select a preamble, and then select an RO; or may first select an RO, and then select a preamble. For example, the terminal device measures RSRPs of a plurality of SSBs. When an RSRP of an SSB is greater than or equal to a threshold, the terminal device may select one preamble (for example, randomly) from one or more preambles to which the SSB is mapped, and then select one RO from one or more ROs to which the SSB is mapped. The selected preamble and the selected RO form the first combination selected by the terminal device.

(b) The Terminal Device Selects a Second Combination (for Example, a PRU):

For example, the terminal device selects the second combination based on a mapping relationship between a first combination and second combinations and a mapping relationship between downlink reference signals and second combinations.

For example, the terminal device selects a PRU based on a mapping relationship between PREs and PRUs and a mapping relationship between SSBs and PRUs.

In an example a, the terminal device uses a second combination to which a candidate downlink reference signal is mapped as the selected second combination, and the candidate downlink reference signal may be understood as a downlink reference signal used to select the first combination.

FIG. 7 is still used as an example for description. For example, RSRPs of the SSB2, the SSB3, and the SSB4 are greater than the specified threshold. Assuming that the terminal device selects the PRE1 because the SSB2 is greater than the specified threshold, the SSB2 is a candidate SSB, and the terminal device selects the PRU2 to which the SSB2 is mapped. Assuming that the terminal device selects the PRE2 because the SSB3 is greater than the specified threshold, the SSB3 is a candidate SSB, and the terminal device selects the PRU3 to which the SSB3 is mapped. Assuming that the terminal device selects the PRE2 because the SSB4 is greater than the specified threshold, the SSB4 is a candidate SSB, and the terminal device selects the PRU4 to which the SSB4 is mapped.

The second combination selected in the manner of the example a meets the following multiple possible cases:

In a possible case, the second combination selected by the terminal device is a second combination to which a downlink reference signal with a largest RSRP is mapped in the M downlink reference signals to which the first combination selected by the terminal device is mapped. It may also be understood that the (one or more) downlink reference signals (for example, SSBs) to which the second combination selected by the terminal device is mapped are downlink reference signals with a largest RSRP in the M downlink reference signals (for example, SSBs) to which the first combination selected by the terminal device is mapped. Optionally, the downlink reference signal with the largest RSRP may be a default downlink reference signal, or may be a downlink reference signal whose RSRP is greater than that of the default downlink reference signal.

In another possible case, the second combination selected by the terminal device is a second combination to which any downlink reference signal whose RSRP is greater than that of the default downlink reference signal is mapped in the M downlink reference signals to which the first combination selected by the terminal device is mapped.

In still another possible case, the second combination selected by the terminal device is a second combination to which a default downlink reference signal is mapped in the M downlink reference signals to which the first combination selected by the terminal device is mapped.

It may be understood that the downlink reference signal with the largest RSRP may be the same as or different from the default downlink reference signal.

In an example b, the terminal device uses, as the selected second combination, a second combination to which a downlink reference signal with a largest RSRP (namely, an optimal measurement result) is mapped in the M downlink reference signals to which the selected first combination is mapped.

The second combination selected in the manner of the example b meets this case: The second combination selected by the terminal device is a second combination to which a downlink reference signal with a largest RSRP is mapped in the M downlink reference signals to which the first combination selected by the terminal device is mapped.

FIG. 7 is still used as an example for description. It is assumed that the terminal device selects the PRU2. For example, if the RSRP of the SSB4 is greater than the RSRP of the SSB3, the PRU4 to which the SSB4 is mapped may be selected.

In an example c, the terminal device uses, as the selected second combination, a second combination to which the default downlink reference signal is mapped in the M downlink reference signals to which the selected first combination is mapped.

The second combination selected in the manner of the example c meets this case: The second combination selected by the terminal device is a second combination to which a default downlink reference signal is mapped in the M downlink reference signals to which the first combination selected by the terminal device is mapped.

In an example d, the terminal device uses, as the selected second combination, a second combination to which any downlink reference signal whose RSRP is greater than that of the default downlink reference signal is mapped in the M downlink reference signals to which the selected first combination is mapped.

Because any downlink reference signal whose RSRP is greater than that of the default downlink reference signal is selected, in a possible case, a downlink reference signal with a largest RSRP is selected, and the second combination selected in the manner of example d may meet this case: The second combination selected by the terminal device is a second combination to which a downlink reference signal with a largest RSRP is mapped in the M downlink reference signals to which the first combination selected by the terminal device is mapped. Certainly, the second combination may alternatively not meet this case.

In an example e, the terminal device uses, as the selected second combination, a second combination to which any downlink reference signal whose RSRP is greater than that of the candidate downlink reference signal is mapped in the M downlink reference signals to which the selected first combination is mapped. The candidate downlink reference signal may be understood as a downlink reference signal used to select the first combination.

Step 504: The terminal device sends a MsgA to the network device, and correspondingly, the network device receives the MsgA sent by the terminal device.

For example, the terminal device sends the message A based on the first combination (for example, a PRE) and the selected second combination (for example, a PRU) selected in step 503.

For example, the message A includes a first preamble and a first uplink reference signal (for example, a DMRS, where the DMRS sent by the terminal device is a DMRS sequence). The terminal device sends the first preamble based on the first combination (for example, a PRE) selected in step 503, and sends the first uplink reference signal based on the second combination (for example, a PRU) selected in step 503.

For example, the terminal device sends the first preamble on a first RO (PRACH time-frequency resource) included in the selected first combination, sends the first uplink reference signal (for example, a DMRS) on a first PO (PUSCH time-frequency resource) included in the selected second combination, and may further send control plane and/or user plane data on the first PO.

The "first" in the first preamble, the "first" in the first uplink reference signal, the "first" in the first RO, and the "first" in the first PO herein are merely used to distinguish from another preamble, an uplink reference signal, an RO, and a PO.

It may also be understood that the first preamble is sent on the first RO, and the first uplink reference signal is sent on the first PO. The first preamble and the first RO are included in the first combination selected by the terminal device, the first uplink reference signal and the first PO are included in the second combination selected by the terminal device, and the selected first combination has a mapping relationship with the selected second combination.

Optionally, step 505 includes: The network device sends a MsgB to the terminal device, and correspondingly, the terminal device receives the MsgB from the network device.

The network device may send the message B by using a beam corresponding to a downlink reference signal (for example, an SSB) to which the second combination (for example, a PRU) selected in step 503 is mapped. Correspondingly, the terminal device receives the MsgB by using a QCL feature the same as that of the downlink reference signal (for example, an SSB) to which the second combination (for example, a PRU) selected in step 503 is mapped.

Optionally, after sending the MsgA, if the terminal device detects a physical downlink control channel (PDCCH) used to schedule a response message for the MsgA, and detects a PDSCH (where the PDSCH carries the message B), the terminal device assumes that a QCL feature of the PDSCH is the same as a QCL feature of an SSB to which the selected PRU is mapped. The PDSCH (carrying the message B) is then received by using the QCL feature of the SSB to which the selected PRU is mapped.

An optimal or better SSB may be further indicated by the PRU selected by the terminal device, so that an access delay and reliability can be better considered. In addition, because the optimal or better SSB is implicitly indicated by the PRU, in a scenario in which the network device detects the PUSCH but does not correctly decode the PUSCH (where the DMRS in the message A is carried in the PUSCH), the optimal or better SSB can also be indicated.

In addition, a default SSB is set in each SSB group. When the network device does not detect PUSCH (where the DMRS in the message A is carried in the PUSCH) transmission, it may be considered that the terminal device selects the default SSB, and sends the response message (for example, the message B) by using the QCL feature the same as that of the default SSB. The terminal device also receives the response message (for example, the message B) by using the quasi co-location (QCL) feature the same as that of the default SSB.

For example, the terminal device receives the response message by using the quasi co-location (QCL) feature the same as that of the default SSB and the QCL feature of the SSB to which the selected PRU is mapped.

Embodiment 2

An SSB indication method applied to a 4-step RA or early data transmission EDT scenario is provided.

Figure 8:
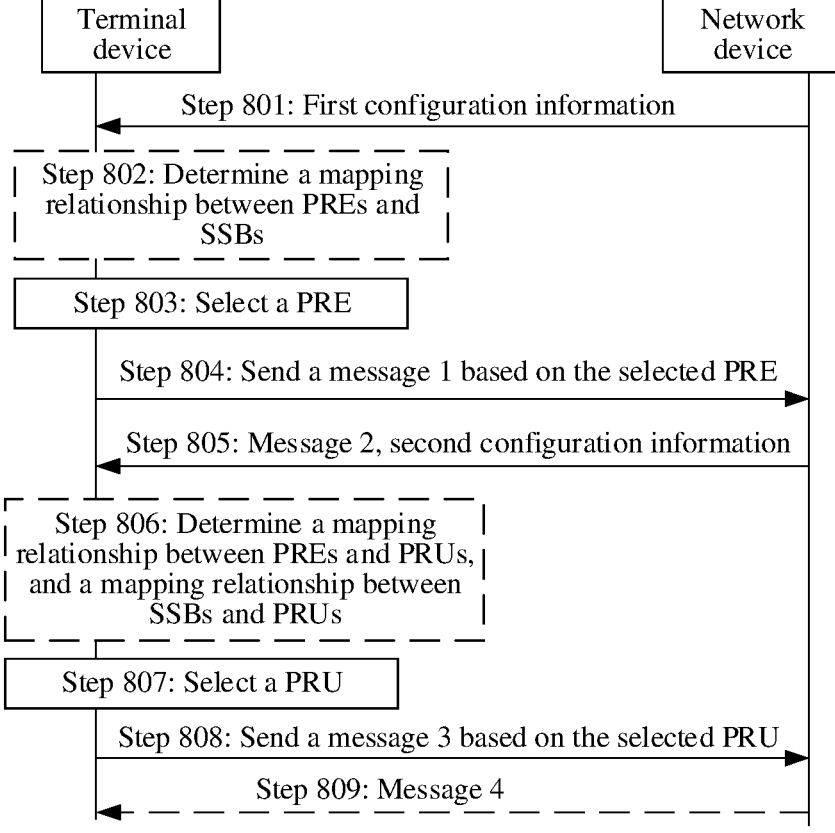
FIG. 8 is a schematic diagram of a communication process according to an embodiment of the present disclosure.

As shown in FIG. 8, a schematic diagram of a communication process is provided, including the following steps:

Step 801: A network device sends first configuration information to a terminal device, and correspondingly, the terminal device receives the first configuration information from the network device.

In an example, the first configuration information indicates one or more of the following:

a quantity S of first combinations, and a quantity mapping relationship (a quantity M of downlink reference signals to which one first combination is mapped) between a first combination and downlink reference signals. S and M are both integers greater than or equal to 2.

Details of the first configuration information are the same as details of some content of the configuration information in step 501.

For example, the information may be included in one message, or may be included in a plurality of messages. Such mapping relationships are quantity mapping relationships, and do not indicate specific content mapping relationships between a specific first combination and a specific downlink reference signal.

One first combination may include one random access channel occasion (RO) and one preamble. The first combination may be a PRE. For different first combinations, ROs are the same and preambles are different; or ROs are different and preambles are the same; or ROs are different and preambles are different.

The downlink reference signal may be an SSB or another downlink reference signal.

In a current technology, a mapping relationship between PREs and SSBs is one-to-one or many-to-one. However, in the present disclosure, the mapping relationship between the PREs and the SSBs is one-to-many. In other words, one PRE is mapped to a plurality of SSBs. One PRE (for example, an RO in the PRE) is mapped to a plurality of SSBs, so that a scanning period of the SSBs is shortened, and the terminal device can find an SSB with an optimal RSRP as soon as possible, thereby reducing a random access delay.

In an example, the first configuration information may explicitly indicate a quantity S of first combinations (for example, PREs); or the first configuration information does not explicitly indicate the quantity S, but includes information for configuring the following content: time-frequency resource locations and/or a quantity of ROs, and a quantity of preambles. Generally, the quantity of preambles is a quantity of Preambles on each RO.

The terminal device may determine the quantity S of PREs (S>1) based on a quantity of ROs (namely, PRACH time-frequency resources) and a quantity of Preambles on each RO. For example, S=the quantity of ROs*the quantity of Preambles on each RO.

In an optional example, the first configuration information may be further used to configure a downlink reference signal (for example, an SSB) measurement threshold, for example, an RSRP threshold.

The first configuration information may be carried in a radio resource control (RRC) message (for example, a system message or a UE-specific RRC message), a physical downlink control channel (PDCCH), or a media access control (MAC) control element (CE). In other words, the network device delivers the first configuration information to the terminal device by using the RRC, the PDCCH, or the MAC CE.

Optionally, step 802 includes: The terminal device determines first combinations and a mapping relationship between a first combination and downlink reference signals based on the first configuration information.

For a process of determining the first combination by the terminal device, refer to the process of determining the first combination in (1) described in step 502. Details are not repeated.

For a process of determining, by the terminal device, the mapping relationship between the first combination and the downlink reference signals, refer to the process of determining the mapping relationship between the first combination and the downlink reference signals in (3) described in step 502.

Step 803: The terminal device selects a first combination (for example, a PRE).

The selected first combination (for example, an RO in the first combination) is used to implicitly indicate a plurality of downlink reference signals SSBs (namely, a group of SSBs) selected by the terminal device.

For a process of selecting, by the terminal device, a first combination (for example, a PRE), refer to the process of selecting, by the terminal device, a first combination (for example, a PRE) described in step 503.

It may be understood that when the default downlink reference signal (for example, a default SSB) is configured by the network device for the terminal device, the default downlink reference signal may be, for example, configured in the first configuration information in step 801, or may be configured in first configuration information different from that in step 801.

Step 804: The terminal device sends a Msg1 to the network device, and correspondingly, the network device receives the Msg1 sent by the terminal device.

A process of sending, by the terminal device, the message 1 to the network device is similar to the process of sending, by the terminal device, the preamble in the message A to the network device in step 504.

For example, the terminal device sends the message 1 based on the first combination (for example, a PRE) selected in step 803.

For example, the message 1 includes a first preamble, and the terminal device sends the first preamble based on the first combination (for example, a PRE) selected in step 803.

For example, the terminal device sends the message 1 (for example, the first preamble) on a first RO (PRACH time-frequency resource) included in the selected first combination.

The "first" in the first preamble and the "first" in the first RO herein are merely used to distinguish from other preambles and ROs.

It may also be understood that the first preamble is sent on the first RO. The first preamble and the first RO are included in the first combination selected by the terminal device.

Step 805: The network device sends a message 2 to the terminal device, and correspondingly, the terminal device receives the message 2 from the network device. The message 2 includes second configuration information.

In an example, details of the second configuration information are the same as details of content of the configuration information in step 501, and details are not repeated. The first configuration information already includes some content in the configuration information in step 501. If details of content of the second configuration information are the same as that of the configuration information in step 501, repeated configuration is caused. The following describes another example of the second configuration information, to avoid repeated configuration.

In this another example, the second configuration information indicates one or more of the following:

a quantity N of second combinations, where N is an integer greater than or equal to 2; and a quantity mapping relationship between downlink reference signals (which may be each downlink reference signal to which the first combination selected in step 803 is mapped) and second combinations.

It should be noted that the quantity N of second combinations herein is a quantity N of second combinations to which the first combination selected by the terminal device is mapped, instead of a total quantity W of second combinations in the configuration information in step 501. For the terminal device, the quantity N of second combinations configured in the second configuration information may be, by default, the quantity N of second combinations to which the first combination selected by the terminal device is mapped. The quantity of second combinations may also be considered as a quantity mapping relationship between a first combination (which may be considered as the first combination selected in step 803) and second combinations, for example, the quantity N of second combinations to which the first combination is mapped.

The terminal device may select one PRE from a plurality of PREs, and implicitly indicate, by using the selected PRE (for example, an RO in the PRE), an SSB group selected by the terminal device. The terminal device then selects one PRU from a plurality of PRUs to which the selected PRE is mapped, and implicitly indicates a better SSB in the SSB group by using the selected PRU (for example, a PO in the PRU). When the network device detects a PUSCH, even if the network device cannot correctly decode the PUSCH, the network device may learn of a better SSB than the SSB group indicated by the PRE. In this way, a beam used during subsequent communication between the network device and the terminal is more accurate, and communication reliability is improved.

In an example, the second configuration information may explicitly indicate the quantity N of second combinations (the quantity N of second combinations to which the first combination selected by the terminal device is mapped), or the second configuration information does not explicitly indicate the quantity N, but includes information for configuring the following content: time-frequency resource locations and/or a quantity of POs, and a quantity of DMRS resources. For example, the quantity of DMRS resources is indicated by information such as a quantity of DMRS ports and a quantity of sequences of each DMRS port. The terminal device may determine the quantity N of PRUs (N>1) based on the quantity of POs and the quantity of DMRS resources on each PO. For example, N=the quantity of POs*the quantity of DMRS resources on each PO.

In an optional example, the second configuration information further indicates one or more of the following: a mapping relationship between second combinations and downlink reference signals (the downlink reference signals to which the first combination selected by the terminal device is mapped). Such mapping relationships are specific content mapping relationships.

The network device may send the message 2 by using a beam corresponding to the downlink reference signal (for example, an SSB) to which the first combination (for example, a PRE) selected in step 803 is mapped. Correspondingly, the terminal device receives the message 2 by using a QCL feature the same as that of the downlink reference signal (for example, an SSB) to which the first combination (for example, a PRE) selected in step 803 is mapped.

Optionally, step 806 includes: The terminal device determines second combinations and a mapping relationship between downlink reference signals and second combinations based on the second configuration information.

In an example, when the second configuration information is the same as the configuration information in step 501:

Optionally, the terminal device may further determine a mapping relationship between a first combination and second combinations.

For a process of determining the second combination by the terminal device, refer to the process of determining the second combination in (2) described in step 502. Details are not repeated.

For a process of determining, by the terminal device, the mapping relationship between the first combination and the second combinations, refer to the process of determining the mapping relationship between the first combination and the second combinations in (4) described in step 502.

For a process of determining, by the terminal device, the mapping relationship between the downlink reference signals and the second combinations, refer to the process of determining the mapping relationship between the downlink reference signals and the second combinations in (5) described in step 502.

In another example, when the second configuration information indicates a quantity N of second combinations and a quantity mapping relationship between downlink reference signals (which may be each downlink reference signal to which the first combination selected in step 803 is mapped) and second combinations:

The terminal device may not need to determine the mapping relationship between the first combination and the second combinations.

The terminal device determines the second combinations. For example, determining N second combinations may be understood as: determining a PO and an uplink reference signal (for example, a DMRS) that are included in each second combination of the N second combinations. For example, the W second combinations are determined in ascending order of first PO frequency domain indexes, then DMRS resource indexes, and finally PO time domain indexes.

In addition, it may be understood that a sequence of ascending according to the DMRS resource indexes, ascending according to the PO frequency domain resource indexes, and ascending according to the PO time domain resource indexes may change randomly. In addition, "ascending" may alternatively be replaced with "descending".

The determining, by the terminal device, the mapping relationship between the downlink reference signals and the second combinations may be:

The network device may configure the mapping relationship between the downlink reference signals and the second combinations for the terminal device. For example, as described in step 805, the second configuration information indicates the mapping relationship between the second combinations and the downlink reference signals (the downlink reference signals to which the first combination selected by the terminal device is mapped). The terminal device may use the mapping relationship configured by the network device as the specific content mapping relationship that needs to be determined in step 806.

Alternatively, the network device configures the quantity mapping relationship between the downlink reference signals and the second combinations for the terminal device, but does not configure specific content of the mapping relationship. For example, as described in step 805, the second configuration information indicates a quantity mapping relationship between downlink reference signals (which may be each downlink reference signal to which the first combination selected in step 803 is mapped) and second combinations. The terminal device may determine the specific content mapping relationship based on the quantity mapping relationship configured by the network device and an agreed mapping rule.

For the agreed mapping rule, refer to the mapping rule in the mapping relationship between the downlink reference signals and the second combinations determined in (5) in step 502.

For example, the index of each downlink reference signal in the M downlink reference signals is mapped to the P second combinations with consecutive indexes in ascending order of the downlink reference signal indexes.

For example, (for example, in ascending order of downlink reference signal indexes) an index of each downlink reference signal in the M downlink reference signals is mapped to the P second combinations in the following order: first, mapping in ascending order of frequency domain indexes of a plurality of POs in frequency division; second, mapping in ascending order of DMRS resource indexes; and third, mapping in ascending order of time domain indexes of a plurality of POs in time division. Optionally, the DMRS resource indexes may be determined in ascending order of first DMRS port numbers and then DMRS sequence indexes. In this rule, a sequence of ascending according to the frequency domain resource indexes of the PO, ascending according to the DMRS resource indexes, and ascending according to the time domain resource indexes of the PO may also change randomly. In addition, "ascending" may alternatively be replaced with "descending".

For example, indexes of every P downlink reference signals in ascending order of downlink reference information indexes are mapped to one second combination in ascending order of second combination indexes.

For example, first, mapping is performed in ascending order of frequency domain indexes of a plurality of POs in frequency division; second, mapping is performed in ascending order of DMRS resource indexes; and third, mapping is performed in ascending order of time domain indexes of a plurality of POs in time division. Optionally, the DMRS resource indexes may be determined in ascending order of first DMRS port numbers and then DMRS sequence indexes. In the foregoing rule, a sequence of ascending according to the frequency domain resource indexes of the PO, ascending according to the DMRS resource indexes, and ascending according to the time domain resource indexes of the PO may also change randomly. In addition, "ascending" may alternatively be replaced with "descending".

Step 807: The terminal device selects a second combination (for example, a PRU).

The selected first combination (for example, an RO in the first combination) is used to implicitly indicate a plurality of SSBs (namely, a group of SSBs) selected by the terminal device, and the selected second combination (for example, a PO in the second combination) is used to implicitly indicate a better optimal SSB (for example, one or more SSBs) in the selected plurality of SSBs.

In an example, when the terminal device determines that there is a mapping relationship between a first combination and second combinations, for a process of step 807, refer to the process of selecting, by the terminal device, a second combination (for example, a PRU) in (b) described in step 503.

In another example, when the terminal device does not determine the mapping relationship between the first combination and the second combinations, the terminal device can select the second combination only based on the mapping relationship between the second combinations and the downlink reference signals (for example, SSBs). The downlink reference signals herein may be, by default, the downlink reference signals to which the first combination selected by the terminal device is mapped. For a process of selecting the second combination, refer to the process of selecting, by the terminal device, a second combination (for example, a PRU) in (b) described in step 503.

Step 808: The terminal device sends a Msg3 to the network device, and correspondingly, the network device receives the Msg3 sent by the terminal device.

A process of step 808 is similar to a process of sending, by the terminal device, the uplink reference signal (for example, a DMRS) in the message A to the network device in step 504.

For example, the terminal device sends the message 3 based on the second combination (for example, a PRU) selected in step 807.

For example, the message 3 includes a first uplink reference signal, and the terminal device sends the first uplink reference signal based on the second combination (for example, a PRU) selected in step 807.

For example, the terminal device sends the message 3 on the first PO (PUSCH time-frequency resource) included in the selected second combination. For example, the first uplink reference signal (for example, a DMRS) may further include control plane and/or user plane data.

The "first" in the first uplink reference signal and the "first" in the first PO herein are merely used to distinguish from other uplink reference signals and POs.

It may also be understood that the first uplink reference signal is sent on the first PO. The first uplink reference signal and the first PO are included in the second combination selected by the terminal device, and the selected first combination has a mapping relationship with the selected second combination.

Optionally, step 809 includes: The network device sends a Msg4 to the terminal device, and correspondingly, the terminal device receives the Msg4 from the network device.

A process of step 809 is similar to a process of sending, by the terminal device, the uplink reference signal (for example, a DMRS) in the message A to the network device in step 504.

The network device may send the message 4 by using a beam corresponding to a downlink reference signal (for example, an SSB) to which the second combination (for example, a PRU) selected in step 807 is mapped. Correspondingly, the terminal device receives the Msg4 by using a QCL feature the same as that of the downlink reference signal (for example, an SSB) to which the second combination (for example, a PRU) selected in step 807 is mapped.

Optionally, after sending the Msg3, if the terminal device detects a physical downlink control channel (PDCCH) used to schedule a response message for the Msg3, and detects a PDSCH (where the PDSCH carries the message 4), the terminal device assumes that a QCL feature of the PDSCH is the same as a QCL feature of an SSB to which the selected PRU is mapped. The PDSCH (carrying the message 4) is then received by using the QCL feature of the SSB to which the selected PRU is mapped.

An optimal or better SSB may be further indicated by the PRU selected by the terminal device, so that an access delay and reliability can be better considered. In addition, because the optimal or better SSB is implicitly indicated by the PRU, the optimal or better SSB can also be indicated in a scenario in which the network device detects a PUSCH (where the message 3 is carried in the PUSCH, that is, the DMRS and the data are carried in the PUSCH) but the PUSCH is not correctly decoded.

In addition, a default SSB is set in each SSB group. When the network device does not detect PUSCH (where the message 3 is carried in the PUSCH, that is, the DMRS and the data are carried in the PUSCH) transmission, it may be considered that the terminal device selects the default SSB, and sends the response message (for example, the message 4) by using the QCL feature the same as that of the default SSB. The terminal device also receives the response message (for example, the message 4) by using the quasi co-location (QCL) feature the same as that of the default SSB.

For example, the terminal device receives the response message by using the quasi co-location (QCL) feature the same as that of the default SSB and the QCL feature of the SSB to which the selected PRU is mapped.

Embodiment 3

An SSB indication method applied to a 4-step RA or early data transmission EDT scenario is provided.

In Embodiment 2, the network device delivers the configuration information to the terminal device twice. To be specific, before the terminal device sends the message 1 (namely, in step 802), the network device delivers the first configuration information to the terminal device, and delivers the second configuration information to the terminal device in the message 2. There are two examples for delivering the second configuration information to the terminal device in the message 2. In an example, the second configuration information is related configuration performed on the first combination (for example, a PRE) selected by the terminal device in step 803. In another example, the second configuration information (the same as the configuration information in step 501) is related configuration performed on a plurality of first combinations (for example, PREs) configured in the first configuration information.

In Embodiment 3, when the second configuration information is the same as the configuration information in step 501, the second configuration information (the same as the configuration information in step 501) is sent to the terminal device before the message 1, and the first configuration information does not need to be sent to the terminal device before the message 1. In other words, in step 801 in FIG. 8, the network device sends the configuration information to the terminal device, and the configuration information is the same as the configuration information in step 501 in FIG. 5.

For other steps in Embodiment 3, for example, determining a first combination and a mapping relationship between a first combination and downlink reference signals, selecting a first combination (for example, a PRE), and sending a Msg1 to the network device, refer to descriptions in step 802 to step 804 in Embodiment 2.

In addition, the terminal device receives a message 2 from the network device, where the message 2 does not include the second configuration information.

In addition, for processes such as determining, by the terminal device, a second combination, a mapping relationship between a first combination and second combinations, a mapping relationship between downlink reference signals and second combinations, selecting a second combination (for example, a PRU), sending a Msg3 to the network device, and receiving a Msg4 from the network device, refer to descriptions in step 806 to step 809 in Embodiment 2.

Embodiment 4

An SSB indication method applied to a 4-step RA, EDT, or 2-step RA scenario is provided.

When a quantity of available preamble resources is large, and a quantity of SSBs to which one RO is mapped is less than or equal to a quantity of preambles, one preamble may indicate an SSB selected by the terminal device. In some cases, for example, when the quantity of available Preamble resources (for example, a quantity of cyclic shifts and a quantity of root sequences) is limited or to save Preamble resources, a plurality of SSBs mapped to a same RO are no longer distinguished by using Preambles. For example, there are cases in which only one Preamble resource is configured for one RO, or a quantity of Preambles configured for one RO is less than a quantity of SSBs to which the RO is mapped, or a plurality of SSBs are mapped to a same PRE.

In these cases, when the terminal device selects a PRE, and sends, on an RO corresponding to the PRE, a Preamble corresponding to the PRE, the network device cannot learn, through Preamble detection only, of an SSB selected by the UE, and cannot determine which SSB has a QCL feature the same as that of the SSB to send a response message. The response message is, for example, a Msg2 of 4-step RA or EDT, or a MsgB (fallback RAR) of 2-step RA. Similarly, the terminal device cannot learn of which SSB has a QCL feature the same as that of the SSB to send the response message by the network device. As a result, a QCL feature used when the terminal device receives the response message is inconsistent with the QCL feature used when the network device sends the response message. For example, the terminal device receives the response message by using a QCL feature the same as that of an SSB1, and the network device sends the response message by using a QCL feature the same as that of an SSB2. In this case, receiving performance is affected, and the response message fails to be received.

Based on this, this embodiment provides a solution. The terminal device and the network device both transmit the response message by using a default SSB. A detailed description is provided below.

Step 901: A network device sends first configuration information to a terminal device, and correspondingly, the terminal device receives the first configuration information from the network device.

For step 901, refer to the description of step 801 in Embodiment 2, and

Optionally, step 902 includes: The terminal device determines first combinations and a mapping relationship between a first combination and downlink reference signals based on the first configuration information.

For step 902, refer to the description in step 802 in Embodiment 2.

Step 903: The terminal device selects a first combination (for example, a PRE).

For step 903, refer to the description in step 803 in Embodiment 2.

It may be understood that, when selecting the first combination, the terminal device may preferentially consider that in M downlink reference signals (for example, SSBs) to which the first combination is mapped, an RSRP of a default downlink reference signal is greater than or equal to a preset threshold.

Step 904: The terminal device sends a Msg1 to the network device, and correspondingly, the network device receives the Msg1 sent by the terminal device.

For step 904, refer to the description in step 804 in Embodiment 2.

Step 905: The network device sends a message 2 to the terminal device, and correspondingly, the terminal device receives the message 2 from the network device.

The network device may send the message 2 by using a beam corresponding to the default downlink reference signal. Correspondingly, the terminal device receives the message 2 by using a QCL feature the same as that of the default downlink reference signal. The default downlink reference signal is a default downlink reference signal in the plurality of downlink reference signals (for example, SSBs) to which the first combination (for example, a PRE) selected in step 903 is mapped.

Subsequently, the terminal device sends the message 3 to the network device, and the network device sends the message 4 to the terminal device. These processes are not limited.

When a quantity of Preambles is limited and SSBs are mapped to PREs in a many-to-one manner, a default SSB is set, so that it can be ensured that a QCL feature used by UE to receive a response message is consistent with a QCL feature used by the network device to send a response message. This can improve response message receiving performance.

Embodiment 5

Step 901 to step 903 may remain unchanged. The message 1 in step 904 may be replaced with a message A. The message 2 in step 905 may be replaced with a message B.

Embodiment 6

An SSB indication method applied to grant-free (GF) transmission is provided.

First, grant-free transmission is described.

Regardless of which type of random access is used, the terminal device needs to send a preamble to the network device by using a physical random access channel (PRACH), so that the network device estimates a timing advance (TA) of the terminal device. However, in some scenarios, for example, the terminal device has obtained an accurate timing advance TA, or a cell radius is small. In this scenario, the terminal device does not need to re-obtain the TA before each data transmission. Based on this, the preamble is sent each time. This actually increases power consumption of the terminal device. Therefore, uplink grant-free transmission in an idle state and an inactive state is introduced, for example, transmission based on a pre-configured uplink resource (PUR) and configured grant (CG) transmission (for example, Type 1 CG).

In the two types of grant-free GF-transmission, the network device configures one or more of the following parameters for uplink transmission of the terminal device by using RRC signaling (for example, a system message or other dedicated RRC signaling): a period of a time domain resource, an open-loop power control-related parameter, a waveform, a redundancy version sequence, a quantity of repetitions, a frequency hopping mode, a resource allocation type, a quantity of hybrid automatic repeat request (HARQ) processes, a parameter related to a DMRS, a modulation and coding scheme table, a size of a resource block group (RBG), a time domain resource, a frequency domain resource, a modulation and coding scheme (MCS), and the like.

After receiving the configuration information, if there is data to be transmitted, the terminal device may immediately perform PUSCH transmission on a configured time-frequency resource (TO) by using the configured transmission parameter, without first sending a Preamble, thereby reducing overheads and power consumption. A same mechanism as random access (RH) may also be used for GF transmission response listening. To be specific, the terminal device determines an RNTI based on information about a resource for sending a PUSCH, and then listens to a response message and the like in a time window by using the RNTI.

In GF transmission, to implement SSB indication, a mapping relationship, for example, a one-to-one or one-to-many mapping relationship, is also established between SSBs and TRUs. A combination of one TO and one DMRS (which may be understood as a DMRS resource, where the DMRS resource includes a DMRS sequence and a DMRS port) may be referred to as one TRU. Different TRUs may be understood as: different TOs and same DMRSs; or same TOs and different DMRSs; or different TOs and different DMRSs.

When detecting DMRS transmission on the TO, the network device can learn of an SSB selected by the terminal device.

When a quantity of DMRS resources is large, and a quantity of SSBs to which one RO is mapped is less than or equal to a quantity of DMRSs, one DMRS may indicate an SSB selected by the terminal device. However, in some cases, for example, when a quantity of available DMRS resources (for example, a quantity of ports or a quantity of sequences) is limited or to save DMRS resources, a plurality of SSBs mapped to a same TO are no longer distinguished by using DMRSs. For example, only one DMRS resource is configured on one TO, or a quantity of DMRSs configured on one TO is less than a quantity of SSBs to which the TO is mapped, or a plurality of SSBs are mapped to a same TRU.

In these cases, when the terminal device selects a TRU, and sends, on a TO corresponding to the TRU, a DMRS corresponding to the TRU, the network device cannot learn, through DMRS detection only, of an SSB selected by the UE, and cannot determine which SSB has a QCL feature the same as that of the SSB to send a response message (PDSCH). For example, the response message is a CGR grant-free response. Similarly, the terminal device cannot learn of which SSB has a QCL feature the same as that of the SSB to send the response message by the network device. As a result, a QCL feature used when the UE receives the response message is inconsistent with the QCL feature used when the network device sends the response message. For example, the UE receives the response message by using a QCL feature the same as that of an SSB1, and the network device sends the response message by using a QCL feature the same as that of an SSB2. In this case, receiving performance is affected, and the response message fails to be received.

Based on this, this embodiment provides a solution. The terminal device and the network device both transmit the response message by using a default SSB. A detailed description is provided below.

Step 1001: A network device sends third configuration information to a terminal device, and correspondingly, the terminal device receives the third configuration information from the network device.

Step 1001 is similar to step 901 (for step 901, refer to the description of step 801 in Embodiment 2), and a difference includes replacement of the name, including, but not limited to:

replacing the first configuration information in step 901 with third configuration information; replacing the RO in step 901 with a TO; replacing the preamble in step 901 with an uplink reference signal or an uplink reference signal resource, where the uplink reference signal is, for example, a DMRS; replacing the PRE in step 901 with a TRU; replacing the first combination in step 901 with a third combination; replacing the quantity S in step 901 with a quantity L; and replacing the quantity M in step 901 with a quantity K.

For example, in an example, the third configuration information indicates one or more of the following:

a quantity L of third combinations, and a quantity mapping relationship (a quantity K of downlink reference signals to which one third combination is mapped) between a third combination and downlink reference signals. L and K are both integers greater than or equal to 2.

Such information may be included in one message, or may be included in a plurality of messages. Such mapping relationships are quantity mapping relationships, and do not indicate specific content mapping relationships between a specific third combination and a specific downlink reference signal.

One third combination may include one TO and one uplink reference signal resource (for example, a DMRS resource). The third combination may be a TRU. For different third combinations, TOs are the same and DMRS resources are different; or TOs are different and DMRS resources are the same; or TOs are different and DMRS resources are different.

The downlink reference signal may be an SSB or another downlink reference signal.

In current technology, a mapping relationship between TRUs and SSBs is one-to-one or many-to-one. However, in the present disclosure, the mapping relationship between the TRUs and the SSBs is one-to-many. In other words, one TRU is mapped to a plurality of SSBs. One TRU (for example, a TO in the TRU) is mapped to a plurality of SSBs, so that a scanning period of the SSBs is shortened, and the terminal device can find an SSB with an optimal RSRP as soon as possible, thereby reducing a data transmission delay.

In an example, the third configuration information may explicitly indicate a quantity L of third combinations (for example, TRUs); or the third configuration information does not explicitly indicate the quantity L, but includes information for configuring the following content: time-frequency resource locations and/or a quantity of TOs, and a quantity of DMRS resources. Generally, the quantity of DMRS resources is a quantity of DMRS resources on each TO. For example, the quantity of DMRS resources is indicated by information such as a quantity of DMRS ports and a quantity of sequences of each DMRS port. For example, the quantity of DMRS resources=the quantity of DMRS ports*the quantity of sequences of each DMRS port.

The terminal device may determine the quantity L of TRUs (L>1) based on a quantity of TOs and a quantity of DMRS resources on each TO. For example, L=the quantity of TOs*the quantity of DMRS resources on each TO.

In an optional example, the third configuration information may be further used to configure a downlink reference signal (for example, an SSB) measurement threshold, for example, an RSRP threshold.

The third configuration information may be carried in a radio resource control (RRC) message (for example, a system message or a UE-specific RRC message), a physical downlink control channel (PDCCH), or a media access control (MAC) control element (CE). In other words, the network device delivers the third configuration information to the terminal device by using the RRC, the PDCCH, or the MAC CE.

Optionally, step 1002 includes: The terminal device determines third combinations and a mapping relationship between a third combination and downlink reference signals based on the third configuration information.

Step 1002 is similar to step 902 (for step 902, refer to the description of step 802 in Embodiment 2).

For a process of determining the third combination, refer to the process of determining the first combination in (1) described in step 502.

For a process of determining the mapping relationship between the third combination and the downlink reference signals, refer to the process of determining the mapping relationship between the first combination and the downlink reference signals in (3) described in step 502.

Pay attention to the name replacement. For the name replacement, refer to the description in step 1001.

In an example, determining third combinations is determining L third combinations, which may be understood as: determining TO resources and DMRS resources included in each third combination in the L third combinations. For example, the L third combinations are determined in ascending order of first DMRS resource indexes, then TO frequency domain indexes, and finally TO time domain indexes.

In addition, it may be understood that a sequence of ascending according to the DMRS resource indexes, ascending according to the TO frequency domain resource indexes, and ascending according to the TO time domain resource indexes may change randomly. In addition, "ascending" may alternatively be replaced with "descending".

In an example, determining a mapping relationship between a third combination and downlink reference signals is, for example, determining K downlink reference signals to which each third combination is mapped (for example, K SSBs to which each TRU is mapped), which may be understood as: determining K downlink reference signals to which a 1th third combination is mapped, where 1 is an integer ranging from 1 to L.

A detailed description is provided below.

In an example a, the network device may configure, for the terminal device, a specific content mapping relationship between a third combination and downlink reference signals. For example, as described in step 1001, the third configuration information indicates K downlink reference signals to which each third combination is mapped. For example, indexes of K downlink reference signals to which a $1^{th}$ third combination is mapped are configured. The terminal device may use the mapping relationship configured by the network device as the specific content mapping relationship that needs to be determined in step 1002.

In another example b, the network device configures the quantity mapping relationship between the third combination and the downlink reference signals for the terminal device, but does not configure specific content of the mapping relationship. For example, as described in step 1001, the third configuration information indicates a quantity K of downlink reference signals to which one third combination is mapped. The terminal device may determine the specific content mapping relationship based on the quantity mapping relationship configured by the network device and an agreed mapping rule.

The agreed mapping rule may be: indexes of every K downlink reference signals are mapped in ascending order of TRU indexes. For example, downlink reference signal resources whose indexes are 1 to K are mapped to a TRU whose index is 1, downlink reference signal resources whose indexes are K+1 to 2K are mapped to a TRU whose index is 2, downlink reference signal resources whose indexes are 2K+1 to 3K are mapped to a TRU whose index is 3, and so on.

Another agreed mapping rule may be: indexes of every K reference signals are mapped to one TRU in the following order: first, mapping in ascending order of DMRS resource indexes on one TO; second, mapping in ascending order of frequency domain indexes of a plurality of TOs in frequency division; and third, mapping in ascending order of time domain indexes of a plurality of TOs in time division.

In the foregoing rule, a sequence of ascending according to the frequency domain resource indexes of the TO, ascending according to the DMRS resource indexes, and ascending according to the time domain resource indexes of the TO may change randomly.

Optionally, the DMRS resource indexes are determined in ascending order of first DMRS port numbers and then DMRS sequence indexes.

In addition, "ascending" may alternatively be replaced with "descending".

Step 1003: The terminal device selects a third combination (for example, a TRU).

Step 1003 is similar to step 903 (for step 903, refer to the description of step 803 in Embodiment 2).

For a process of selecting the third combination, refer to the process of selecting the first combination (for example, a PRE) by the terminal device in (a) described in step 503.

Pay attention to the name replacement. For the name replacement, refer to the description in step 1001.

For example, the terminal device selects the third combination based on a mapping relationship between downlink reference signals and a third combination.

For example, the terminal device selects a TRU based on a many-to-one mapping relationship between SSBs and TRUs.

In an example, for any third combination, a default downlink reference signal (for example, a default SSB) is set in K downlink reference signals (for example, SSBs) to which the third combination is mapped. For example, a default SSB is set for each SSB group. The default downlink reference signal (for example, a default SSB) may be specified in a protocol. For example, it may be specified that a downlink reference signal with a smallest index, a downlink reference signal with a largest index, or a downlink reference signal that meets a condition in the K downlink reference signals is the default downlink reference signal. The default downlink reference signal (for example, a default SSB) may alternatively be configured by the network device for the terminal device, for example, configured in the third configuration information in step 1001, or may be configured in third configuration information different from that in step 1001. For example, a downlink reference signal with a smallest index, a downlink reference signal with a largest index, or a downlink reference signal that meets a condition may be configured as the default downlink reference signal.

In an example, a reference signal received power RSRP of at least one downlink reference signal in the K downlink reference signals (for example, SSBs) to which the third combination selected by the terminal device is mapped is greater than or equal to a preset threshold. Whether an RSRP of the default downlink reference signal in the K downlink reference signals to which the selected third combination is mapped is greater than the threshold is not limited.

For example, the terminal device measures RSRPs of a plurality of SSBs. When an RSRP of an SSB is greater than or equal to the threshold, the terminal device may select a TRU to which the SSB (or an SSB group in which the SSB is located) is mapped.

In another optional example, in K downlink reference signals (for example, SSBs) to which the third combination selected by the terminal device is mapped, an RSRP of a default downlink reference signal is greater than or equal to a preset threshold.

The terminal device may determine a default downlink reference signal in K downlink reference signals to which each third combination is mapped. When determining that an RSRP measurement result of a default downlink reference signal (for example, a default SSB) in K downlink reference signals (for example, SSBs) to which a third combination is mapped is greater than or equal to a threshold, the terminal device selects the third combination. For example, the terminal device selects the third combination only when the RSRP of the default downlink reference signal in the plurality of downlink reference signals to which the third combination is mapped is greater than or equal to the threshold.

In an optional example, if RSRPs of all SSBs are not greater than or equal to the threshold, the terminal device may select a TRU to which an SSB with a largest RSRP is mapped. Alternatively, the terminal device does not select the TRU, and does not perform a subsequent operation.

In another optional example, when selecting the third combination, the terminal device may first select a DMRS resource, and then select a TO; or may first select a TO, and then select a DMRS resource. For example, the terminal device measures RSRPs of a plurality of SSBs. When an RSRP of an SSB is greater than or equal to a threshold, the terminal device may select one DMRS resource (for example, randomly) from one or more DMRS resources to which the SSB is mapped, and then select one TO from one or more TOs to which the SSB is mapped. The selected DMRS resource and the selected TO form the third combination selected for the terminal device.

It may be understood that, when selecting the third combination, the terminal device may preferentially consider that in K downlink reference signals (for example, SSBs) to which the third combination is mapped, an RSRP of a default downlink reference signal is greater than or equal to a preset threshold.

Step 1004: The terminal device sends a PUSCH to the network device, and correspondingly, the network device receives the PUSCH sent by the terminal device.

Step 1004 is similar to step 904 (for step 904, refer to the description of step 804 in Embodiment 2), and a difference includes replacement of the name. For the name replacement, refer to the description in step 1001. In addition, the message 1 in step 901 may be replaced with a PUSCH, where the PUSCH includes an uplink reference signal, for example, a DMRS. The DMRS sent by the terminal device is a DMRS sequence.

For example, the terminal device sends the PUSCH based on the third combination (for example, a TRU) selected in step 1003.

For example, the PUSCH includes an uplink reference signal (for example, a DMRS), and the terminal device sends the first uplink reference signal (for example, a first DMRS) based on the third combination (for example, a TRU) selected in step 1003.

For example, the terminal device sends the PUSCH (for example, the first DMRS) on the first TO included in the selected third combination.

The "first" in the first uplink reference signal, the "first" in the first DMRS, and the "first" in the first TO herein are merely used to distinguish from other uplink reference signals, DMRSs, and TOs.

It may also be understood that the first uplink reference signal (for example, the first DMRS) is sent on the first TO. The first uplink reference signal (for example, the first DMRS) and the first TO are included in the third combination selected by the terminal device.

Step 1005: The network device sends a response message to the terminal device, and correspondingly, the terminal device receives the response message from the network device.

The network device may send the response message by using a beam corresponding to the default downlink reference signal. Correspondingly, the terminal device receives the response message by using a QCL feature the same as that of the default downlink reference signal. The default downlink reference signal is a default downlink reference signal in the plurality of downlink reference signals (for example, SSBs) to which the third combination (for example, a TRU) selected in step 1003 is mapped.

When a quantity of DMRSs is limited and SSBs are mapped to TRUs in a many-to-one manner, a default SSB is set, so that it can be ensured that a QCL feature used by UE to receive a response message is consistent with a QCL feature used by the network device to send a response message. This can improve response message receiving performance.

The foregoing describes the method in embodiments of the present disclosure, and the following describes an apparatus in embodiments of the present disclosure. The method and the apparatus are based on a same technical idea. The method and the apparatus have similar principles for resolving problems. Therefore, for implementations of the apparatus and the method, refer to each other. Details are not repeated herein.

In embodiments of the present disclosure, the apparatus may be divided into functional modules based on the foregoing method examples. For example, the apparatus may be divided into functional modules corresponding to functions, or two or more functions may be integrated into one module. These modules may be implemented in a form of hardware, or may be implemented in a form of a software functional module. It is to be noted that, in this embodiment, module division is an example, and is merely a logical function division. In a specific implementation, another division manner may be used.

Figure 9:
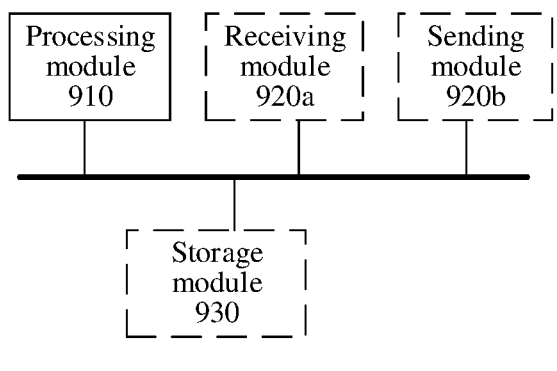
FIG. 9 shows a communication apparatus according to an embodiment of the present disclosure.

Based on the same technical concept as the foregoing method, FIG. 9 is a schematic diagram of a structure of a communication apparatus 900. The apparatus 900 may include a processing module 910, and optionally, further includes a receiving module 920*a*, a sending module 920*b*, and a storage module 930. The processing module 910 may be separately connected to the storage module 930, the receiving module 920*a*, and the sending module 920*b*, and the storage module 930 may also be connected to the receiving module 920*a* and the sending module 920*b*.

In an example, the receiving module 920*a* and the sending module 920*b* may alternatively be integrated, and are defined as a transceiver module.

In an example, the apparatus 900 may be a terminal device, or may be a chip or a functional unit applied to a terminal device. The apparatus 900 has any function of the terminal device in the foregoing method. For example, the apparatus 900 can perform the steps performed by the terminal device in the methods in FIG. 2, FIG. 3, FIG. 5, and FIG. 8, and Embodiments 1 to 6.

The receiving module 920*a* may perform a receiving action performed by the terminal device in the foregoing method embodiments.

The sending module 920*b* may perform a sending action performed by the terminal device in the foregoing method embodiments.

The processing module 910 may perform another action other than the sending action and the receiving action in the actions performed by the terminal device in the foregoing method embodiments.

In an example, the receiving module 920*a* is configured to receive configuration information from the network device, including one or more of first configuration information, second configuration information, third configuration information, a message B, a message 2, a message 4, and a downlink reference signal (for example, an SSB).

In an example, the sending module 920*b* is configured to send one or more of a message A, a message 1, an uplink reference signal (for example, a DMRS), a preamble, and the like to the network device.

In an example, the processing module 910 is configured to perform one or more of the following: determine a mapping relationship between a first combination and downlink reference signals, determine a mapping relationship between a first combination and second combinations, determine a mapping relationship between second combinations and downlink reference signals, select second combinations, select first combinations, determine a mapping relationship between a third combination and downlink reference signals, select third combinations, determine a default downlink reference signal, and the like.

In an example, the storage module 930 may store a computer-executable instruction of the method performed by the terminal device, so that the processing module 910, the receiving module 920*a*, and the sending module 920*b* perform the method performed by the terminal device in the foregoing example.

For example, the storage module may include one or more memories. The memory may be one or more devices or components in a circuit that are used to store a program or data. The storage module may be a register, a cache, a RAM, or the like. The storage module may be integrated with the processing module. The storage module may be a ROM or another type of static storage device that can store static information and instructions. The storage module may be independent of the processing module.

The transceiver module may be an input/output interface, a pin, a circuit, or the like.

In an example, the apparatus 900 may be a network device, or may be a chip or a functional unit applied to a network device. The apparatus 900 has any function of the network device in the foregoing method. For example, apparatus 900 can perform the steps performed by the network device in the methods in FIG. 2, FIG. 3, FIG. 5, and FIG. 8, and Embodiments 1 to 6.

The receiving module 920*a* may perform a receiving action performed by the network device in the foregoing method embodiments.

The sending module 920*b* may perform a sending action performed by the network device in the foregoing method embodiment.

The processing module 910 may perform another action other than the sending action and the receiving action in the actions performed by the network device in the foregoing method embodiments.

In an example, the sending module 920*b* is configured to send, to the terminal device, configuration information, including one or more of first configuration information, second configuration information, third configuration information, a message B, a message 2, a message 4, and a downlink reference signal (for example, an SSB).

In an example, the receiving module 920*a* is configured to receive one or more of a message A, a message 1, an uplink reference signal (for example, a DMRS), a preamble, and the like from the terminal device.

In an example, the processing module 910 is configured to perform one or more of the following: determine a mapping relationship between a first combination and downlink reference signals, determine a mapping relationship between a first combination and second combinations, determine a mapping relationship between second combinations and downlink reference signals, determine a mapping relationship between a third combination and downlink reference signals, determine a default downlink reference signal, and the like.

In an example, the storage module 930 may store a computer-executable instruction of the method performed by the network device, so that the processing module 910, the receiving module 920*a*, and the sending module 920*b* perform the method performed by the network device in the foregoing example.

For example, the storage module may include one or more memories. The memory may be one or more devices or components in a circuit that are used to store a program or data. The storage module may be a register, a cache, a RAM, or the like. The storage module may be integrated with the processing module. The storage module may be a ROM or another type of static storage device that can store static information and instructions. The storage module may be independent of the processing module.

The transceiver module may be an input/output interface, a pin, a circuit, or the like.

The foregoing describes the apparatus applied to the terminal device and the apparatus applied to the network device in embodiments of the present disclosure. The following describes possible product forms of the apparatus applied to the terminal device and the apparatus applied to the network device. It should be understood that any form of product having the features of the apparatus applied to the terminal device in FIG. 9 and any form of product having the features of the apparatus applied to the network device fall within the protection scope of the present disclosure. It should be further understood that the following description is merely an example, and should not be limited to a product form of the apparatus applied to the terminal device in embodiments of the present disclosure, and a product form of the apparatus applied to the network device.

As a possible product form, the apparatus may be implemented using a general bus architecture.

Figure 10:
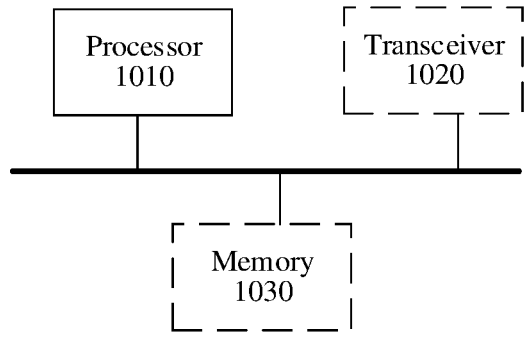
FIG. 10 shows a communication apparatus according to an embodiment of the present disclosure.

FIG. 10 is a schematic block diagram of a communication apparatus 1000.

The apparatus 1000 may include a processor 1010, and optionally, further include a transceiver 1020 and a memory 1030. The transceiver 1020 may be configured to receive a program or instructions and transmit the program or the instructions to the processor 1010. Alternatively, the transceiver 1020 may be configured to perform communication interaction between the apparatus 1000 and another communication device, for example, exchange control signaling and/or service data. The transceiver 1020 may be a code and/or data read/write transceiver, or the transceiver 1020 may be a signal transmission transceiver between the processor and the transceiver. The processor 1010 and the memory 1030 are electrically coupled.

In an example, the apparatus 1000 may be a terminal device, or may be a chip applied to a terminal device. It should be understood that the apparatus has any function of the terminal device in the foregoing method. For example, the apparatus 1000 can perform the steps performed by the terminal device in the methods in FIG. 2, FIG. 3, FIG. 4, FIG. 5, and FIG. 6. For example, the memory 1030 is configured to store a computer program. The processor 1010 may be configured to invoke the computer program or instructions stored in the memory 1030, to perform the method performed by the terminal device in the foregoing example, or perform, by using the transceiver 1020, the method performed by the terminal device in the foregoing example.

In an example, the apparatus 1000 may be a network device, or may be a chip applied to a network device. It should be understood that the apparatus has any function of the network device in the foregoing method. For example, the apparatus 1000 can perform the steps performed by the network device in the methods in FIG. 2, FIG. 3, FIG. 4, FIG. 5, and FIG. 6. For example, the memory 1030 is configured to store a computer program. The processor 1010 may be configured to invoke the computer program or instructions stored in the memory 1030, to perform the method performed by the network device in the foregoing example, or perform, by using the transceiver 1020, the method performed by the network device in the foregoing example.

The processing module 910 in FIG. 9 may be implemented by using the processor 1010.

The receiving module 920*a* and the sending module 920*b* in FIG. 9 may be implemented by using the transceiver 1020. Alternatively, the transceiver 1020 includes a receiver and a transmitter. The receiver performs functions of the receiving module, and the transmitter performs functions of the sending module.

The storage module 930 in FIG. 9 may be implemented by using the memory 1030.

As a possible product form, the apparatus may be implemented by a general-purpose processor (also referred to as a chip or a chip system).

In a possible implementation, a general-purpose processor that implements an apparatus applied to a terminal device or an apparatus applied to a network device includes a processing circuit (where the processing circuit may also be referred to as a processor), and optionally, further includes an input/output interface and a storage medium (where the storage medium may also be referred to as a memory) that are connected to and communicate with the processing circuit. The storage medium is configured to store instructions executed by the processing circuit, to perform the method performed by the terminal device or the network device in the foregoing example.

The processing module 910 in FIG. 9 may be implemented by using the processing circuit.

The receiving module 920*a* and the sending module 920*b* in FIG. 9 may be implemented by using the input/output interface. Alternatively, the input/output interface includes an input interface and an output interface. The input interface performs functions of the receiving module, and the output interface performs functions of the sending module.

The storage module 930 in FIG. 9 may be implemented by using a storage medium.

As a possible product form, the apparatus in embodiments of the present disclosure may be further implemented by using the following: one or more field programmable gate arrays (FPGAs), a programmable logic device (PLD), a controller, a state machine, a gate logic, a discrete hardware component, any other proper circuit, or any combination of circuits that may perform various functions described in the present disclosure.

An embodiment of the present disclosure further provides a computer-readable storage medium that stores a computer program. When the computer program is executed by a computer, the computer is enabled to perform the foregoing communication method. In other words, the computer program includes instructions for implementing the foregoing communication method.

An embodiment of the present disclosure further provides a computer program product, including computer program code. When the computer program code is run on a computer, the computer is enabled to perform the communication method provided above.

In addition, the processor mentioned in embodiments of the present disclosure may be a central processing unit (CPU) or a baseband processor. The baseband processor and the CPU may be integrated or separated, or may be a network processor (NP) or a combination of a CPU and an NP. The processor may further include a hardware chip or another general-purpose processor. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL) and another programmable logic device, a discrete gate or a transistor logic device, a discrete hardware component, or the like, or any combination thereof. The general-purpose processor may be a microprocessor, or the processor may be any conventional processor or the like.

The memory mentioned in embodiments of the present disclosure may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It is to be noted that the memory described in the present disclosure aims to include but is not limited to these memories and any memory of another proper type.

The transceiver mentioned in embodiments of the present disclosure may include a separate transmitter and/or a separate receiver, or the transmitter and the receiver may be integrated. The transceiver may operate according to an instruction of a corresponding processor. Optionally, the transmitter may correspond to a transmitter machine in a physical device, and the receiver may correspond to a receiver machine in the physical device.

Persons of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. Persons of ordinary skill in the art may use different methods to implement the described functions for each particular application, but it should not be considered that the implementation goes beyond the scope of the present disclosure.

In the several embodiments provided in the present disclosure, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments in the present disclosure.

In addition, functional units in embodiments of the present disclosure may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in the present disclosure essentially, or the part contributing to the conventional technology, or all or some of the technical solutions may be represented in a form of a software product. The computer software product is stored in a storage medium and includes several instructions for instructing a computer device (which may be a personal computer, a server, a network device, or the like) to perform all or some of the steps of the methods described in embodiments of the present disclosure. The foregoing storage medium includes: any medium that can store program code, such as a USB flash drive, a removable hard disk, a ROM, a RAM, a magnetic disk, or an optical disc.

The term "and/or" in the present disclosure describes an association relationship for describing associated objects and represents that one of three relationships may exist. For example, A and/or B may represent any of the following three cases: Only A exists, both A and B exist, or only B exists. The character "/" generally indicates an "or" relationship between the associated objects. "A plurality of" in the present disclosure means two or more. In addition, it should be understood that in the present disclosure, terms such as "first" and "second" are merely used for distinguishing and description, but should not be understood as indicating or implying relative importance, or should not be understood as indicating or implying a sequence.

Although some embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Clearly, persons skilled in the art can make various modifications and variations to embodiments of the present disclosure without departing from the scope of embodiments of the present disclosure. In this way, the present disclosure is intended to cover these modifications and variations to embodiments of the present disclosure provided that they fall within the scope of protection defined by the following claims and their equivalent technologies of the present disclosure.

What is claimed is:

1. A communication method, applied to a communication apparatus and comprising:

receiving configuration information from a network device, wherein the configuration information indicates a quantity of downlink reference signals to which one first combination is mapped and a quantity of second combinations to which one first combination is mapped, the first combination comprises a random access channel occasion (RO) and a preamble, each of the second combinations comprises a physical uplink shared channel occasion (PO) and an uplink reference signal, one first combination is mapped to a plurality of downlink reference signals, and one first combination is mapped to a plurality of second combinations;

determining a mapping relationship between a first combination and downlink reference signals, a mapping relationship between a first combination and second combinations, and a mapping relationship between second combinations and downlink reference signals based on the configuration information; and sending a first message to the network device, wherein the first message comprises a first preamble and a first uplink reference signal, the first preamble is sent on a first RO, and the first uplink reference signal is sent on a first PO; the first preamble and the first RO are comprised in a first combination selected by the communication apparatus; the first uplink reference signal and the first PO are comprised in a second combination selected by the communication apparatus; the selected first combination has a mapping relationship with the selected second combination; and the selected first combination is selected based on downlink reference signals.

2. The method according to claim 1, wherein the configuration information further indicates the mapping relationship between the first combination and the downlink reference signals, the mapping relationship between the first combination and the second combinations, and the mapping relationship between the second combinations and the downlink reference signals.

3. The method according to claim 1, wherein in a plurality of downlink reference signals to which the selected first combination is mapped, a reference signal received power (RSRP) of at least one downlink reference signal is greater than or equal to a preset threshold; or in a plurality of downlink reference signals to which the selected first combination is mapped, an RSRP of a default downlink reference signal is greater than or equal to a preset threshold.

4. The method according to claim 3, wherein the selected second combination is:

a second combination to which a downlink reference signal with a largest RSRP is mapped in the plurality of downlink reference signals to which the selected first combination is mapped; or a second combination to which the default downlink reference signal is mapped in the plurality of downlink reference signals to which the selected first combination is mapped; or a second combination to which any downlink reference signal whose RSRP is greater than that of the default downlink reference signal is mapped in the plurality of downlink reference signals to which the selected first combination is mapped.

5. The method according to claim 1, wherein, in a plurality of downlink reference signals to which the selected first combination is mapped, an RSRP of a default downlink reference signal is greater than or equal reset threshold, and the method further comprises:

determining the default downlink reference signal in the plurality of downlink reference signals to which the first combination is mapped.

6. The method according to claim 1, wherein in a plurality of downlink reference signals to which the selected first combination is mapped, an RSRP of a default downlink reference signal is greater than or equal to a preset the threshold, and the default downlink reference signal is specified in a protocol or configured by the network device.

7. The method according to claim 1, further comprising:
receiving a second message from the network device by using a quasi co-location (QCL) feature that is the same as that of a downlink reference signal to which the selected second combination is mapped.

8. A communication method, applied to a communication apparatus and comprising:
receiving first configuration information from a network device, wherein the first configuration information indicates a quantity of downlink reference signals to which one first combination is mapped, wherein the first combination comprises a random access channel occasion (RO) and a preamble, and one first combination is mapped to a plurality of downlink reference signals;
determining a mapping relationship between a first combination and downlink reference signals based on the first configuration information;
sending a first message to the network device, wherein the first message comprises a first preamble, the first message is sent on a first RO, the first preamble and the first RO are comprised in a first combination selected by the communication apparatus, and the selected first combination is selected based on downlink reference signals;
receiving a second message from the network device, wherein the second message comprises second configuration information, the second configuration information indicates a quantity of second combinations, and each of the second combinations comprises a physical uplink shared channel occasion (PO) and an uplink reference signal;
determining, based on the second configuration information, a mapping relationship between the second combinations and downlink reference signals to which the selected first combination is mapped; and
send a third message to the network device, wherein the third message comprises a first uplink reference signal, the third message is sent on a first PO, and the first uplink reference signal and the first PO are comprised in a second combination selected by the communication apparatus.

9. The method according to claim 8, wherein the first configuration information further indicates the mapping relationship between the first combination and the downlink reference signals; and/or
the second configuration information further indicates the mapping relationship between the second combinations and the downlink reference signals to which the selected first combination is mapped.

10. The method according to claim 8, wherein in the plurality of downlink reference signals to which the selected first combination is mapped, a reference signal received power (RSRP) of at least one downlink reference signal is greater than or equal to a preset threshold; or
in the plurality of downlink reference signals to which the selected first combination is mapped, an RSRP of a default downlink reference signal is greater than or equal to a preset threshold.

11. The method according to claim 10, wherein the selected second combination is:
a second combination to which a downlink reference signal with a largest RSRP is mapped in the plurality of downlink reference signals to which the selected first combination is mapped; or a second combination to which the default downlink reference signal is mapped in the plurality of downlink reference signals to which the selected first combination is mapped; or
a second combination to which any downlink reference signal whose RSRP is greater than that of the default downlink reference signal is mapped in the plurality of downlink reference signals to which the selected first combination is mapped.

12. The method according to claim 8, wherein, in the plurality of downlink reference signals to which the selected first combination is mapped, an RSRP of a default downlink reference signal is greater than or equal to preset threshold, and the method further comprises:
determining the default downlink reference signal in the plurality of downlink reference signals to which the first combination is mapped.

13. The method according to claim 8, wherein in the plurality of downlink reference signals to which the elected first combination is mapped, an RSRP of a default downlink reference signal is greater than or equal to a preset threshold, and the default downlink reference signal is specified in a protocol or configured by the network device.

14. The method according to claim 8, further comprising:
receiving the second message from the network device by using a quasi co-location (QCL) feature that is the same as that of a downlink reference signal to which the selected second combination is mapped.

15. A communication method, applied to a communication apparatus and comprising:
receiving configuration information from a network device, wherein the configuration information indicates a quantity of downlink reference signals to which one first combination is mapped, wherein the first combination comprises a random access channel occasion (RO) and a preamble, and one first combination is mapped to a plurality of downlink reference signals;
determining a mapping relationship between a first combination and downlink reference signals based on the configuration information;
sending a first message to the network device, wherein the first message comprises a first preamble, the first message is sent on a first RO, the first preamble and the first RO are comprised in a first combination selected by the communication apparatus, and the selected first combination is selected based on downlink reference signals; and
receiving a second message from the network device by using a quasi co-location (QCL) feature that is the same as that of a default downlink reference signal, wherein the default downlink reference signal is in a plurality of downlink reference signals to which the selected first combination is mapped.

16. The method according to claim 15, wherein the configuration information further indicates the mapping relationship between the first combination and the downlink reference signals.

17. The method according to claim 15, wherein in the plurality of downlink reference signals to which the selected first combination is mapped, a reference signal received power (RSRP) of the default downlink reference signal is greater than or equal to a preset threshold.

18. The method according to claim 15, further comprising:
determining the default downlink reference signal in the plurality of downlink reference signals to which the first combination is mapped.

19. The method according to claim 15, wherein the default downlink reference signal is specified in a protocol or configured by the network device.

\* \* \* \* \*